United States Patent
Konickson et al.

(10) Patent No.: US 6,923,515 B2
(45) Date of Patent: Aug. 2, 2005

(54) LOW NOISE TRACK PROFILE

(75) Inventors: Mike Konickson, Thief River Falls, MN (US); Ron Bergman, Mentor, MN (US); Ronald M. Black, Red Lake Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/373,601

(22) Filed: Feb. 24, 2003

(65) Prior Publication Data

US 2004/0164613 A1 Aug. 26, 2004

(51) Int. Cl.$^7$ .............................................. B62D 55/24
(52) U.S. Cl. ...................................... 305/165; 305/178
(58) Field of Search ............................... 305/157, 160, 305/165, 178, 180, 195, 197

(56) References Cited

U.S. PATENT DOCUMENTS

| | | | | |
|---|---|---|---|---|
| 2,325,690 A | * | 8/1943 | Leguillon | 305/180 |
| 3,680,929 A | * | 8/1972 | Hnilicka et al. | 305/201 |
| 4,150,857 A | * | 4/1979 | Dester et al. | 305/108 |
| 4,279,449 A | * | 7/1981 | Martin et al. | 305/178 |
| 5,484,321 A | * | 1/1996 | Ishimoto | 446/433 |
| 5,540,489 A | * | 7/1996 | Muramatsu et al. | 305/197 |
| 5,709,440 A | | 1/1998 | Lecours | |

2001/0030467 A1  10/2001  Courtemanche

OTHER PUBLICATIONS

Yves St. Pierre et al. Blueprint "Moules Interieur Standard 2.52×15×48 Pas", Aluminum Chenille Sans Bruit, Soucy International Inc., Jan. 23, 1997.

* cited by examiner

Primary Examiner—Russell D. Stormer
(74) Attorney, Agent, or Firm—Black Lowe & Graham; Darren J. Jones

(57) ABSTRACT

A track for a tracked vehicle, consisting of a track substrate. Terrain lugs are distributed about the circumference the track substrate on its outer surface. Drive profiles, each consisting of at least one drive lug arranged across the width of the track substrate, are distributed about the circumference of the track substrate on its inner surface. The drive profiles may consist of at least two drive lugs spaced apart across the width of the track substrate. Projections are distributed on the inner surface of the track substrate, arranged so as to engage a wheel in a track system that includes the track. The projections are disposed circumferentially between two drive profiles, and may also be disposed laterally between two drive lugs. The projections have a height such that the noise generated when the track moves in a track system is less than the noise generated when a track without such projections moves in a track system. A noise reduction of at least 6 to 8 dB is achievable. The projections may be from at least 3% to at least 7% of the radius of a wheel in the track system.

78 Claims, 23 Drawing Sheets

Section B-B

LOW NOISE TRACK PROFILE

BACKGROUND OF THE INVENTION

1. Field of the Invention

The invention relates to a profile for a track, such as a track used on a snowmobile or other tracked vehicle. More particularly, the invention relates to a track that produces less noise and/or vibration when in use than conventional tracks.

2. Description of Related Art

Track drives and their use on vehicles are well known. Conventional track drives typically include one or more continuous tracks, which move in a closed loop. Conventionally, one or more wheels may be used to help keep the track moving in its desired path. Rails or other additional support structures may also be used to help guide the track. Also, conventional track drives typically include a drive wheel or other mechanism to cause the track to move circumferentially, so as to drive the vehicle.

Track drives provide good traction, and can accommodate rough terrain. In addition, because track drives can be made so that they contact the ground (or other surface) with a large area, they are useful for moving across soft or giving surfaces, and for supporting heavy loads.

For these reasons, track drives are commonly used on snowmobiles, which operate primarily on snow and ice, and are often used in difficult terrain.

A snowmobile with a conventional track drive is illustrated in FIG. 1. As may be seen therein, a continuous track 10 is directed in part by one or more wheels 30. The wheels 30 are not powered, but rotate as the track 10 moves.

As may be seen in FIG. 2, a conventional vehicle track consists of a track substrate 11, and may include drive lugs 16 distributed circumferentially along an inner surface 12 of the track 10. Typically, the drive lugs 16 are shaped to provide good engagement between the track 10 and a drive wheel or other drive mechanism (not shown).

In addition, a conventional vehicle track may include terrain lugs 18 distributed circumferentially along an outer surface 14 of the track substrate 11. Typically, the terrain lugs 18 are shaped to engage the terrain on which the vehicle moves, i.e. snow and ice for the snowmobile illustrated in FIG. 1.

A magnified view of a section of a conventional track 10 is shown in FIG. 2.

A conventional track typically is constructed of some flexible material, so that it bends as it passes around the drive mechanism, wheels, and/or other guide structures. Exemplary arrangements of wheels 30 that make up a portion of a conventional suspension system for a tracked vehicle may be seen in FIGS. 3–5.

It is noted that the individual wheels in a given track system may have different functions, different sizes, etc. For example, certain of the wheels 30 shown in FIGS. 3–5 are used to change the direction of a track, while other wheels 30 shown therein are used to support the vehicle's weight and transfer it to the track, to keep the track from contacting other components, or to perform other functions. Wheels may have names specific to their function or location, i.e. "idler wheel", "roller wheel", etc. However, for purposes of this application, the precise nature and function of the wheels is of concern primarily insofar as the wheels interact with a track to produce noise and vibration. For this reason, the wheels are referred to collectively herein, although they may not be identical in form or function.

As is visible from FIG. 2, the presence of the drive lugs 16 and the terrain lugs 18 significantly increases the thickness of the track 10 at some points along its circumference. Even if the drive lugs 16 and terrain lugs 18 also are made of flexible material, the track 10 often is much less flexible in the vicinity of the drive lugs 16 and the terrain lugs 18 at least in part because of the increased thickness. In addition, as shown in FIG. 2, conventional tracks 10 may be deliberately made stiffer in the vicinity of the drive lugs 16 and terrain lugs 18, for example by including bars 17 of relatively rigid material therein.

One result of this may be seen in FIG. 6. FIG. 6 shows a schematic view of a portion of a conventional track 10 where it passes around a wheel 30, changing direction as it does so. Because the track 10 is thicker near the drive lugs 16 and terrain lugs 18, it is relatively rigid there. As a result, the track 10 does not bend readily in the areas near the drive lugs 16 and terrain lugs 18, and those areas of the track 10 remain relatively flat. Most or all of the bending of the track 10 occurs in areas in between adjacent drive lugs 16 and terrain lugs 18.

As may be seen from FIG. 6, with such an arrangement, a conventional track 10 does not fit closely to a conventional wheel 30 while changing direction around the wheel 30. As illustrated, the track 10 actually makes contact with the wheel 30 only in the immediate vicinity of the drive lugs 16 and terrain lugs 18.

It is believed that such an arrangement contributes to the generation of noise and vibration as the track 10 moves around the wheel 30. For example, as the track 10 moves around the wheel 30, the track 10 makes contact with the wheel 30 only at intermittent points, rather than smoothly engaging the wheel 30. This process is essentially a series of impacts between the track 10 and the wheel 30, which may generate considerable noise and/or vibration.

In addition, in the areas between the drive lugs 16 and terrain lugs 18, the track 10 is unsupported. The track 10 in those areas is free to move back and forth with any existing vibrations or impacts, potentially causing it to strike the wheel 30. This also may contribute to the noise and vibration produced by the track drive.

Interaction between a conventional track 10 and wheels 30 may also contribute to noise and vibration in other ways, even if the track is not changing direction as shown in FIG. 6.

For example, in FIG. 7 two wheels 30 are shown in schematic form in an arrangement wherein they support at least part of the weight of a vehicle. The wheel 30 that is shown to be aligned with a drive lug 16 and terrain lug 18 does not appreciably deform the track 10. However, the wheel 30 that is shown to be between adjacent drive lugs 16 and terrain lugs 18 does deform the track 10; the weight of the vehicle presses the wheel downward.

The phenomenon illustrated in FIG. 7, which is sometimes referred to as "bridging", results in the wheels 30 moving up and down as the track 10 moves. This motion is in some ways similar to what would occur if a wheel is made to move over a series of fixed obstacles in its path. The noise and/or vibration may resulting from such motion may be considerable.

It is noted that in actuality, the deformation of the track 10 between adjacent drive lugs 16 and terrain lugs 18 may be sinusoidal, or otherwise curved. However, for clarity it is pictured as straight-line deformity in FIG. 7.

Regardless of the precise source(s), it may be desirable to reduce the noise and/or vibration generated in conventional track drives. For example, track vibration may be unpleasant for the vehicle operator, and track noise likewise may be disadvantageous to the vehicle operator and/or persons nearby. In addition, mechanical vibrations may contribute to wear on the track drive and/or other vehicle components.

SUMMARY OF THE INVENTION

It is the purpose of the claimed invention to overcome these difficulties, thereby providing an improved track profile that produces less noise and/or vibration in operation. It is noted that, although noise may be considered to be vibration for many purposes, not all vibrations are noise. Thus, vibration as referred to herein includes, but is not limited to, non-noise vibration such as mechanical vibration of a vehicle or components thereof.

An exemplary embodiment of a track in accordance with the principles of the claimed invention includes a plurality of terrain lugs distributed about the circumference of the track on its outer surface.

The track also includes a plurality of drive profiles distributed about the circumference of the track on its inner surface. Each of the drive profiles includes at least one drive lug arranged somewhere along the lateral width of the track. The drive profiles may include two or more drive lugs spaced apart laterally across the width of the track.

A plurality of projections is distributed about the circumference of the track on the inner surface. The projections are arranged to engage a wheel in a track system that includes the track. Each of the projections is disposed circumferentially between two of the drive profiles, and/or may be disposed laterally between two drive lugs.

The projections have a height such that the noise and/or vibration generated when the track moves in a track system is less than the noise and/or vibration generated when a conventional track without such projections moves in a track system.

The projections may define gaps therein extending laterally across their width, in order to facilitate bending of the track in the area of the projections.

The projections may have a curved cross section. Alternatively, the projections may have a cross section in the shape of two flat wedges.

For a track for an otherwise conventional snowmobile having a wheel with a radius of approximately 2.5 inches, the projections may have a height of approximately 0.075 to 0.175 inches. More generally, the projections may have a height that is approximately 3% to 7% of the wheel radius.

The noise produced by a track in accordance with the principles of the claimed invention may be at least 4 dB less than the noise produced by a conventional track, preferably at least 6 to 8 dB less. It is noted that, as dB are a logarithmic unit, a noise decrease of 4 dB represents a noise reduction of 50%. The reduction in vibration produced by a track in accordance with the principles of the claimed invention also is believed to be substantial.

BRIEF DESCRIPTION OF THE DRAWINGS

Like reference numbers generally indicate corresponding elements in the figures.

DETAILED DESCRIPTION OF THE PREFERRED EMBODIMENT

Figure 1:
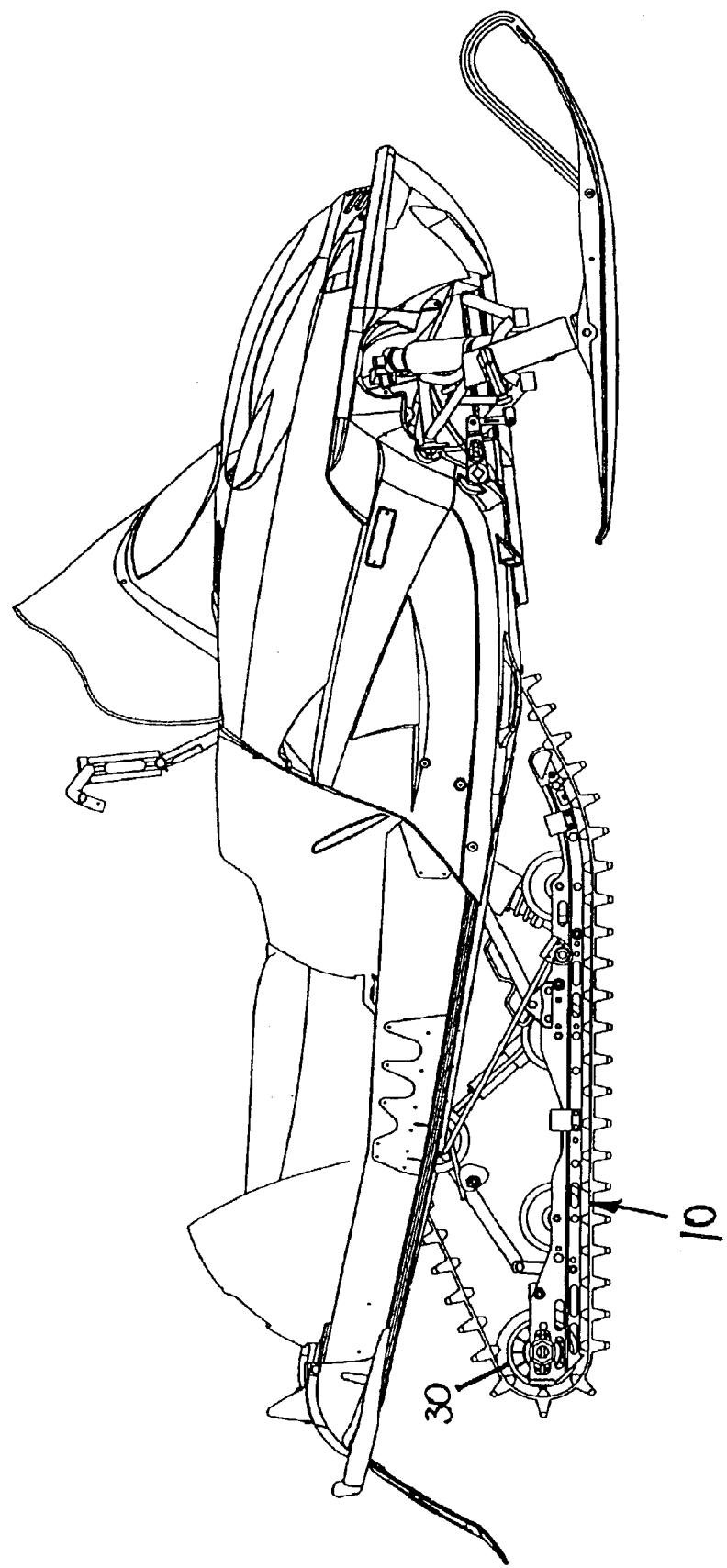
FIG. 1 is an illustration of a snowmobile with a conventional track, as known from the prior art.
Figure 2:
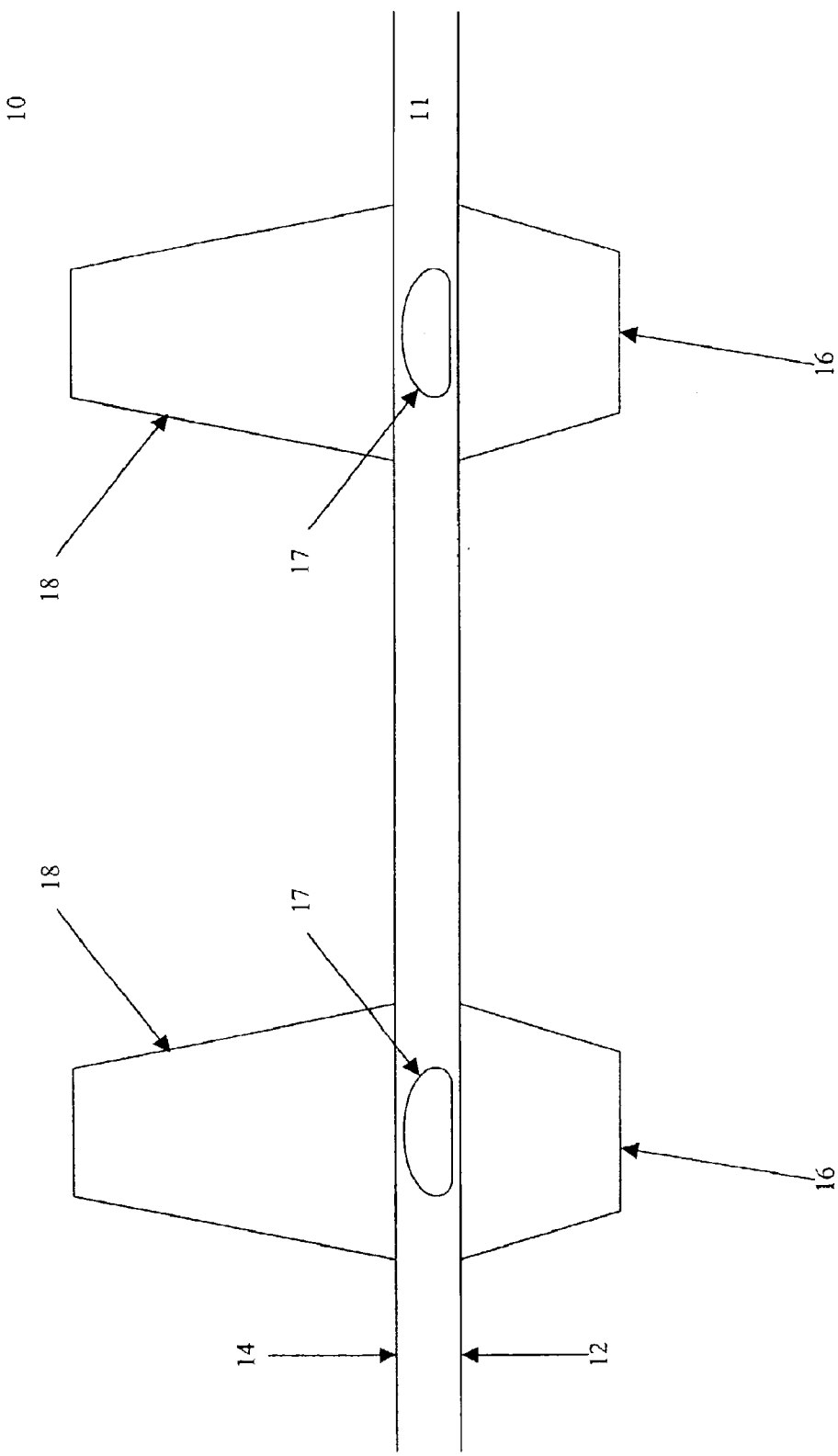
FIG. 2 a magnified circumferentially cross section of a portion of a conventional track, as known from the prior art.
Figure 3:
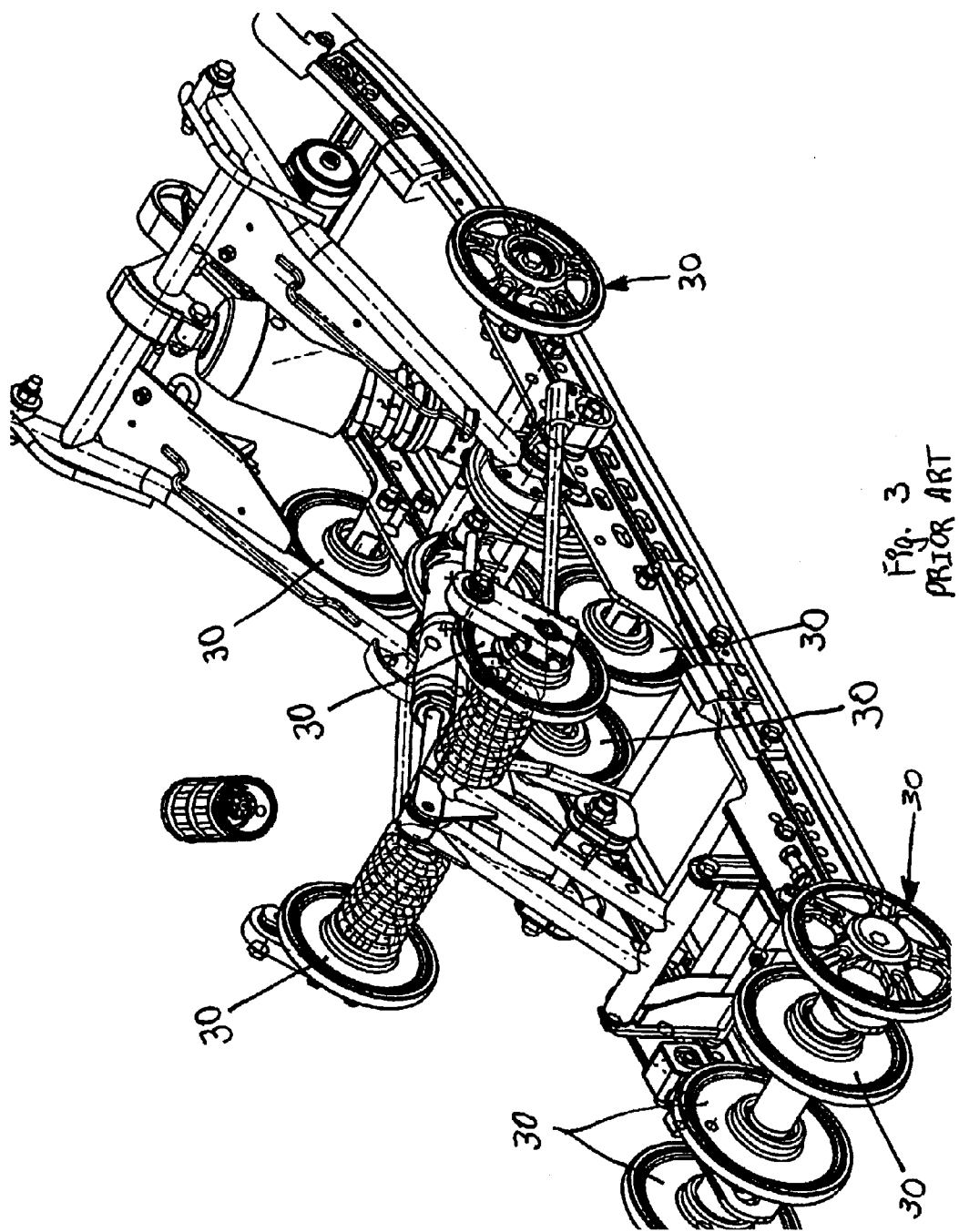
FIG. 3 is an illustration of a suspension system with a conventional arrangement of wheels, as known from the prior art.
Figure 4:
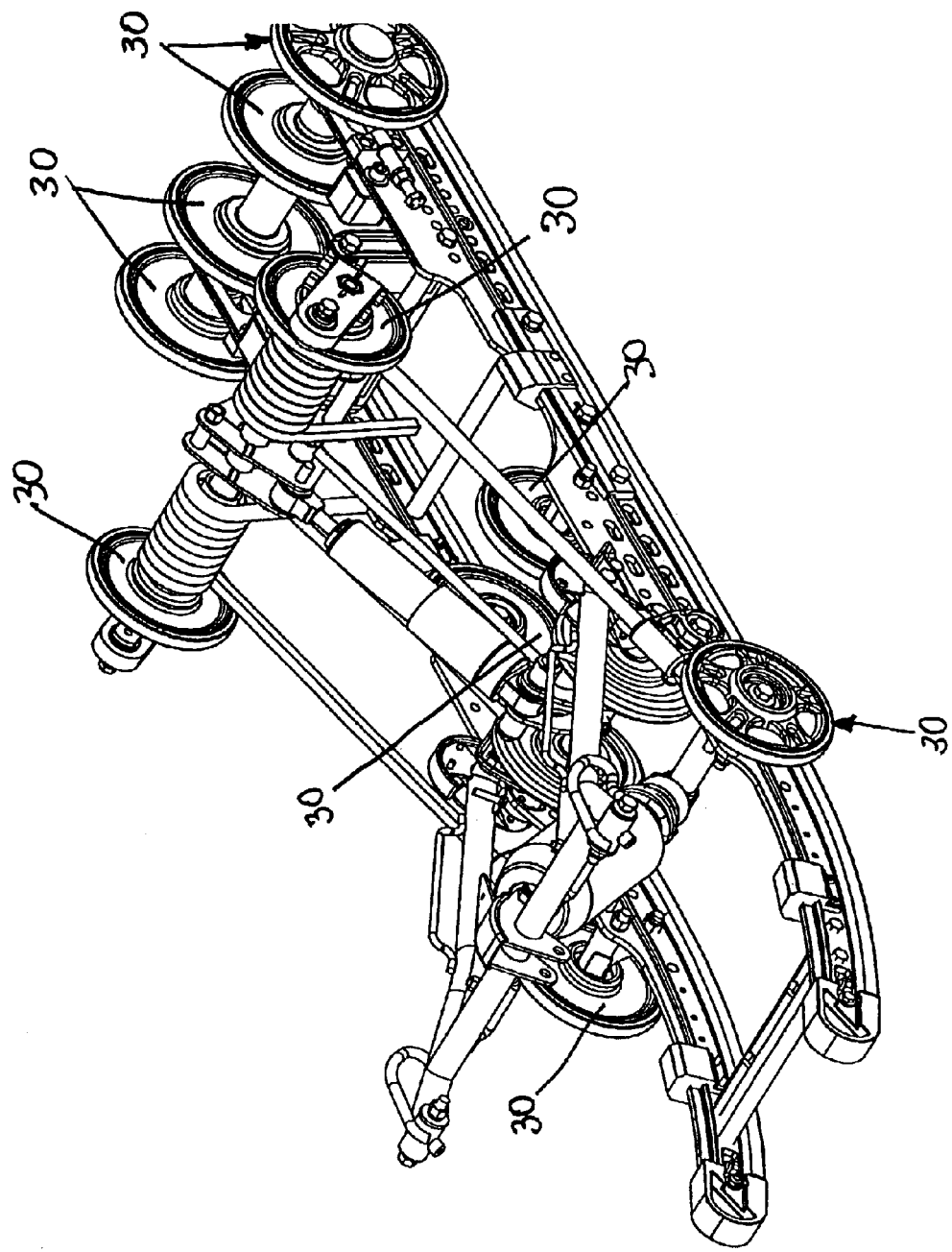
FIG. 4 is another view of the suspension system shown in FIG. 3.
Figure 5:
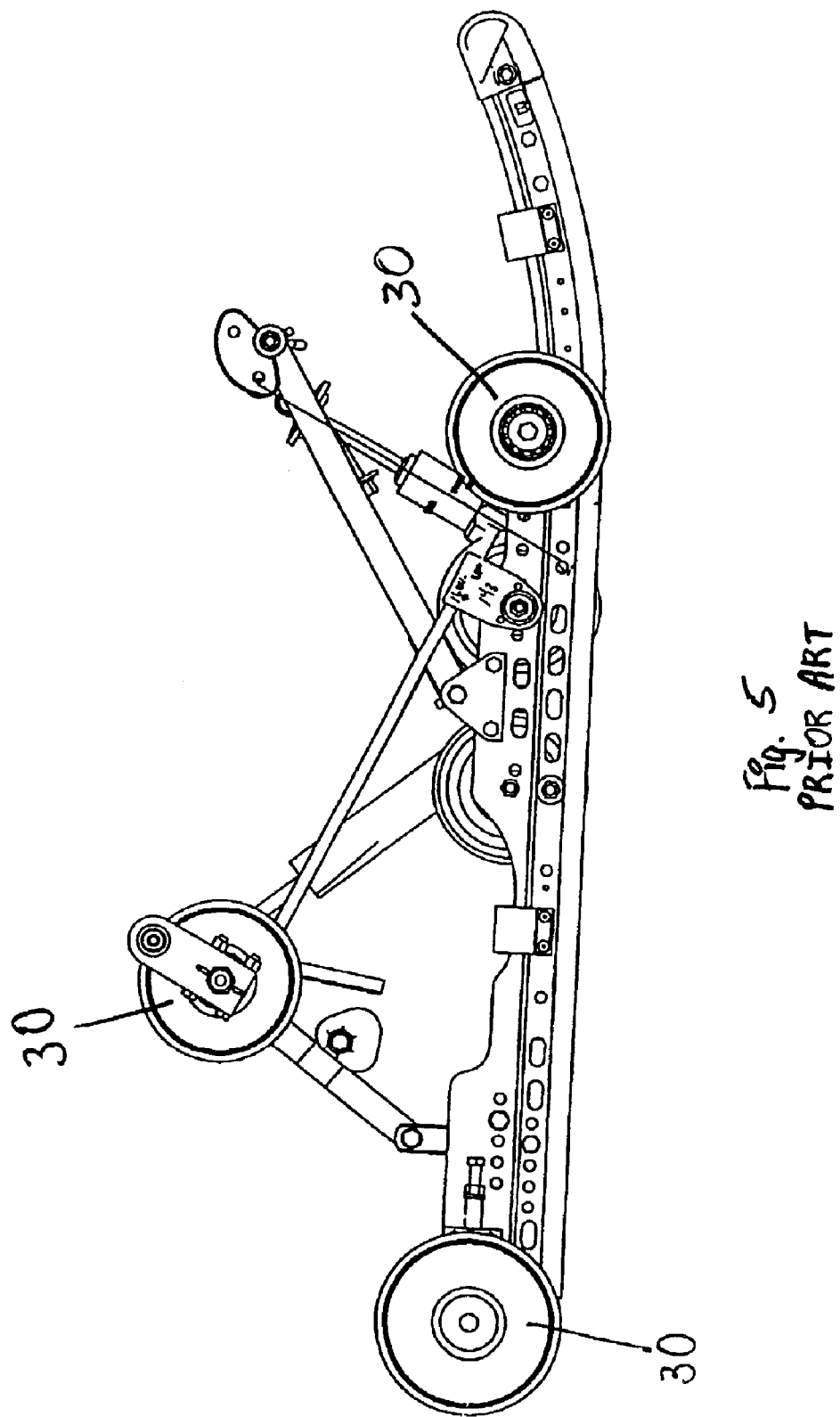
FIG. 5 is another view of the suspension system shown in FIG. 3.
Figure 6:
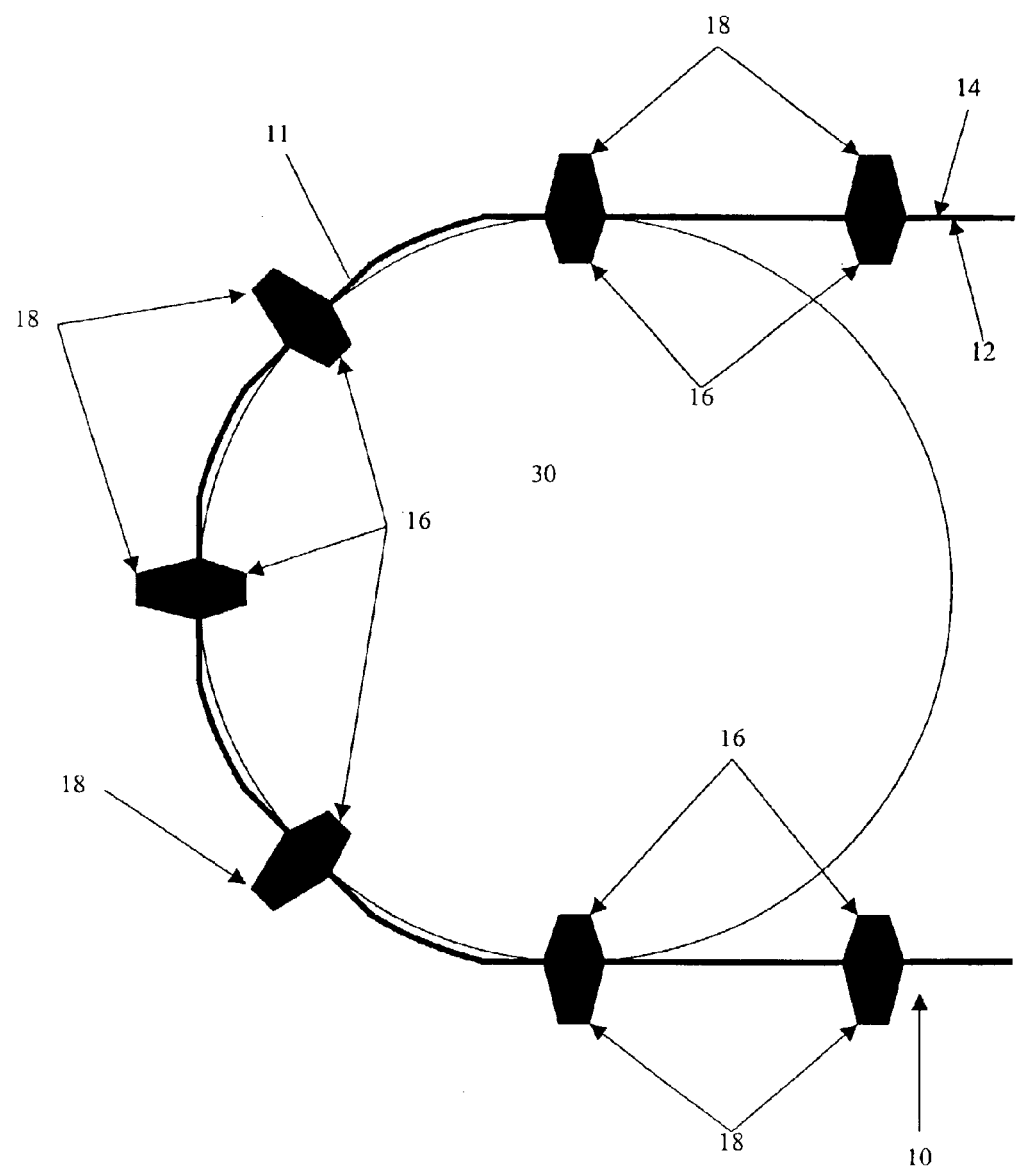
FIG. 6 is a schematic figure showing engagement between an exemplary wheel and a conventional track, as known from the prior art.
Figure 7:
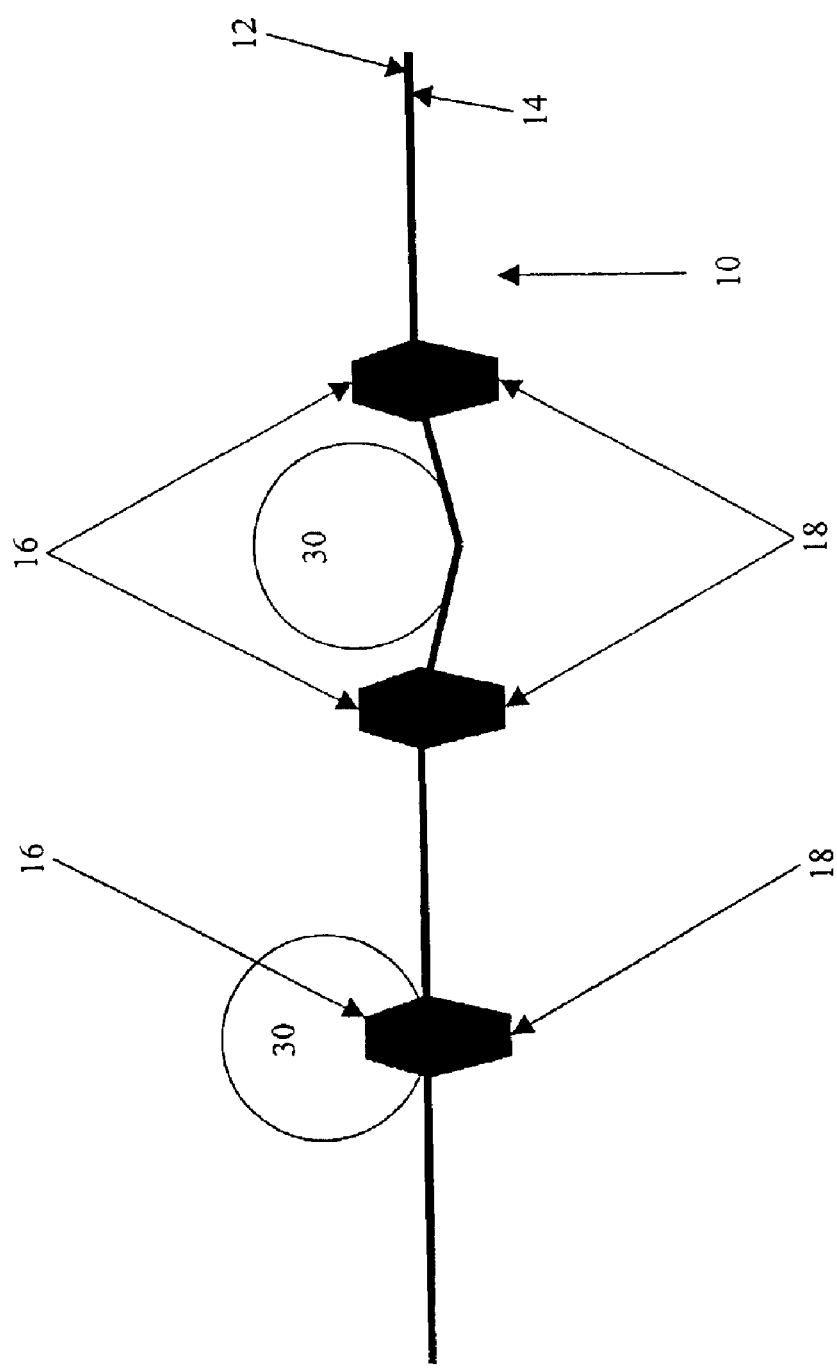
FIG. 7 is a schematic figure showing engagement between other exemplary wheels and a conventional track, as known from the prior art.
Figure 8:
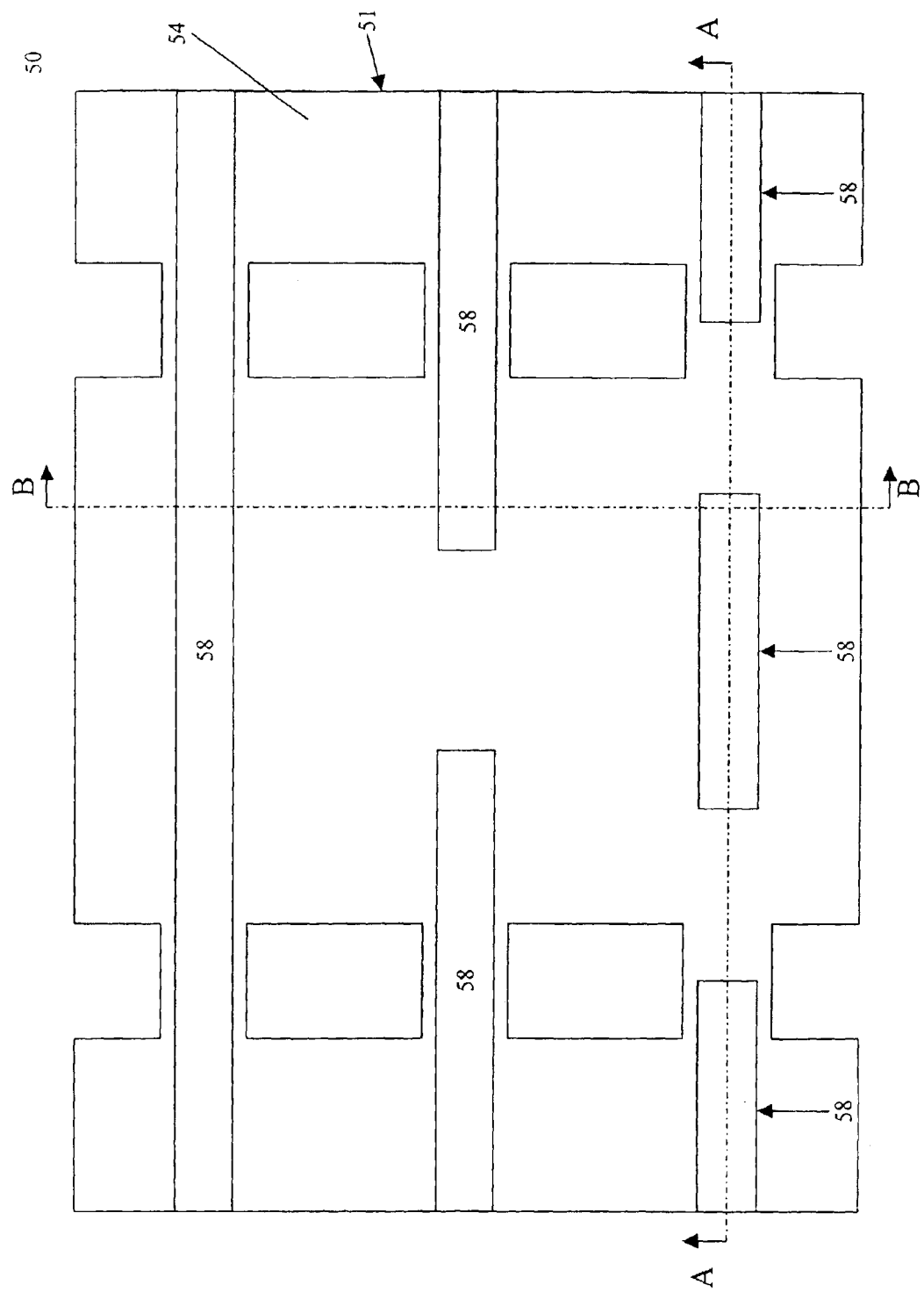
FIG. 8 is an overhead view of a portion of the outer surface of an exemplary embodiment of a track in accordance with the principles of the claimed invention.

Referring to FIG. 8, a track 50 in accordance with the principles of the claimed invention includes a track substrate 51. The track substrate 51 is adapted to form a continuous loop through a track system. However, the precise structure of the track substrate 51 may vary considerably depending on the particular embodiment. In some embodiments, the track substrate 51 may be integrally formed as a continuous loop. In other embodiments, the track substrate 51 may be made of one or more segments that are joined together.

For purposes of this application, the term "lateral" is used to refer to locations, directions, distributions, etc. in the direction perpendicular to the track's motion within a track system, i.e. the width of the track 50. Thus, lugs distributed laterally across the track 50 are spread across the width of the track.

In a similar manner, the term "circumference" is used herein to describe the perimeter of the continuous loop structure of the track 50. Thus, lugs distributed circumferentially are spread around the perimeter of the track 50.

Although the term "circumference" is sometimes used specifically to describe the perimeter of a circle, it is not so used herein; use of the term "circumference" herein in reference to the track 50 should not be considered to imply that the track 50 necessarily is circular in shape.

The track substrate 51 is sufficiently flexible to enable the track 50 to curve and/or bend as it moves along the path of a track system. The precise structure and materials of the track substrate 51 may vary from embodiment to embodiment. In certain embodiments, the track substrate 51 may be made partially or completely of a flexible material, such as rubber.

Alternatively, in other embodiments the track substrate 51 may be made partially or completely of rigid materials structured so as to be flexible. For example, a track substrate 51 constructed of a series of movable links or segments connected with articulated joints could be made flexible, even if the individual links were rigid.

Both rigid and flexible material track substrates 51 are well known, and are not further described herein.

It is noted that the track substrate 51, as well as other elements of the track 50, may include reinforcing members or structures not otherwise described herein. For example, a reinforcing layer such as a flexible steel mesh belt may be incorporated into the track substrate 51.

Figure 12:
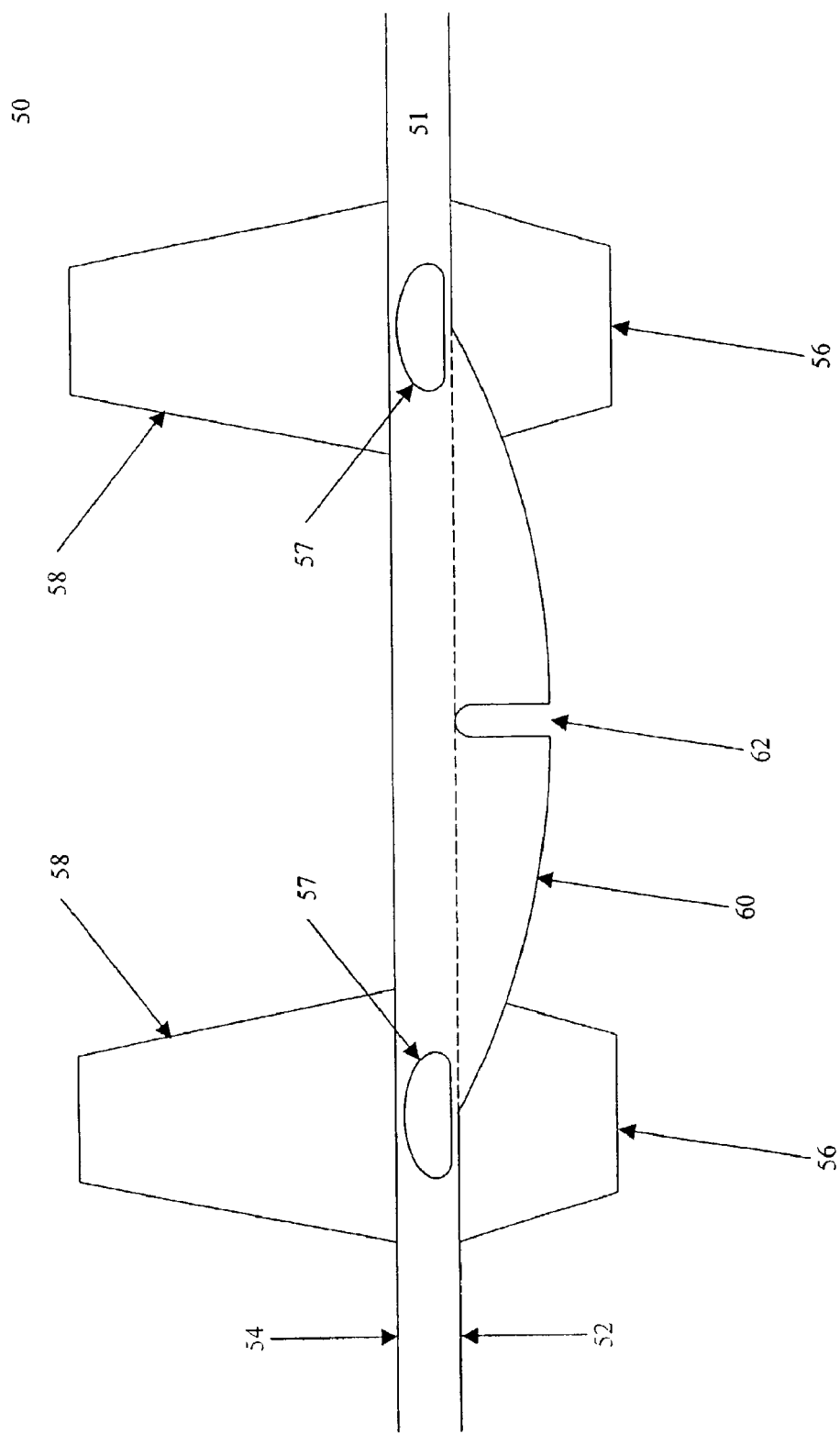
FIG. 12 is a magnified lateral cross section of a portion of an exemplary embodiment of a track in accordance with the principles of the claimed invention.
Figure 14:
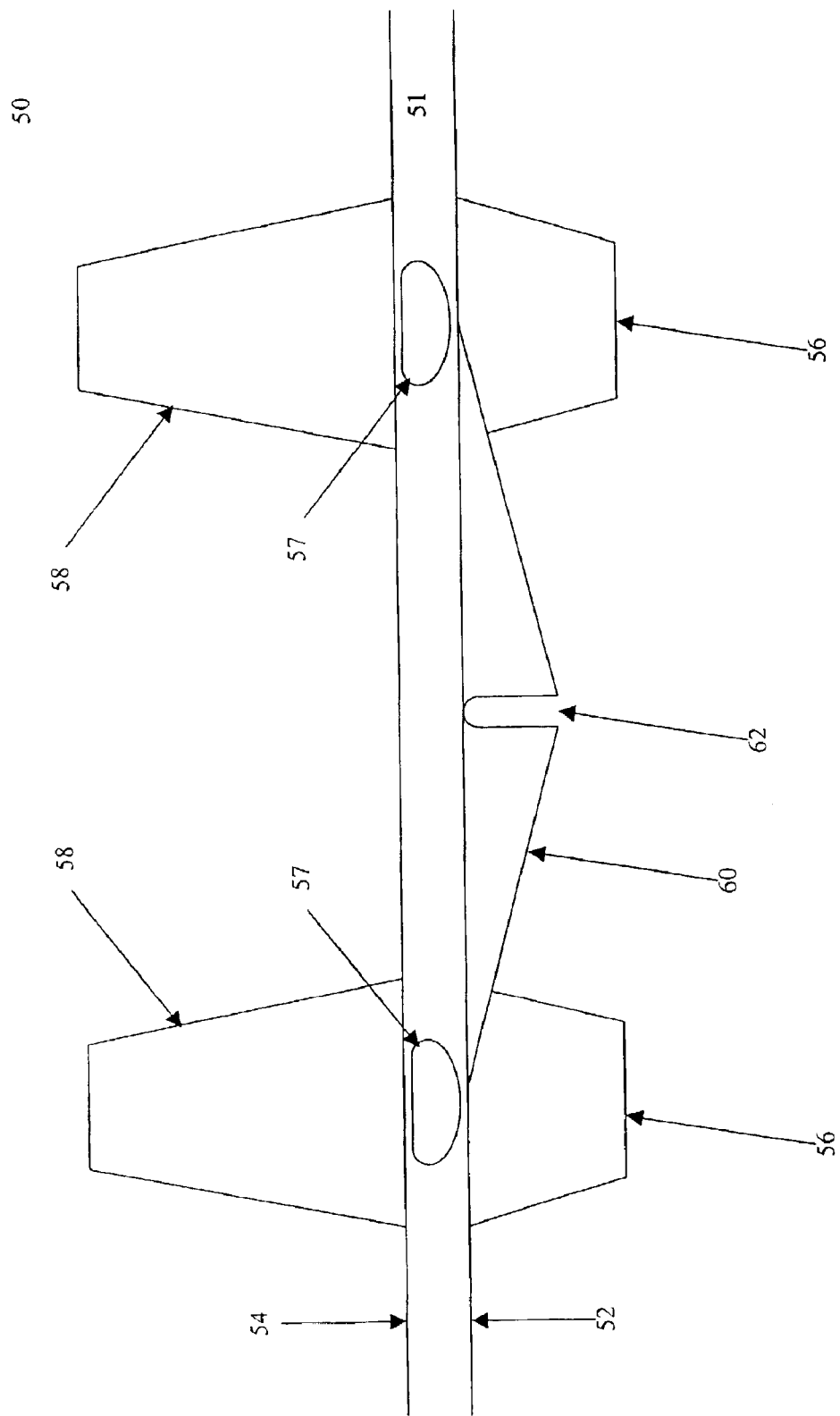
FIG. 14 is a magnified lateral cross section of a portion of another exemplary embodiment of a track in accordance with the principles of the claimed invention.

Similarly, the drive lugs 56 and/or terrain lugs 58 (see below) may include reinforcing members such as rigid plates or rods, either on the surface of the lugs or incorporated therein. For example, as illustrated in FIGS. 12 and 14, the track 50 includes rods 57 embedded in the substrate 51 and aligned with the drive lugs 56 and terrain lugs 58, to increase the stiffness of the track 50 at those points. Such rods 57 may be made of relatively stiff materials, including but not limited to fiberglass.

As illustrated, the rods 57 have a cross section with one flat side and a convex side opposite the flat side. However, this is exemplary only; a wide variety of shapes may be equally suitable. Furthermore, the orientation of such structures may vary considerably, i.e., as shown in FIG. 14 the rods 57 are inverted as compared to the rods 57 shown in FIG. 12.

In addition, the use of rods 57 as shown in FIGS. 12 and 14 is itself exemplary only. Embodiments having reinforcing members or structures other than those described and shown may be equally suitable. Likewise, embodiments without reinforcing members or structures may also be equally suitable.

On the outer surface 54 of the track substrate 51, the track 50 includes a plurality of terrain lugs 58. The terrain lugs 58 are adapted to engage the terrain over which the vehicle with the track 50 thereon passes. For example, for a snowmobile, the terrain lugs 58 might be formed with shapes, sizes, and arrangements especially suitable for engaging snow and ice.

The precise configuration of the terrain lugs 58 may vary from embodiment to embodiment. A variety of factors may determine the configuration of the terrain lugs 58, including but not limited to: the surface to be traversed; the weight of the vehicle; the desired speed, maneuverability, acceleration, and other performance of the vehicle; and the desired ride characteristics for the vehicle, i.e. smoothness, good "road feel", etc.

As illustrated in FIG. 8, the configurations of the individual terrain lugs 58 on the section of the track 50 shown are dissimilar. The uppermost portion of the track 50 has a single terrain lug 58 that is continuous across the width of the track substrate 51, while the middle portion has two terrain lugs 58 spaced apart laterally, and the lower portion has three terrain lugs 58 also spaced apart laterally. Although for certain embodiments it may be advantageous for all the terrain lugs 58 on a given track 50 to be identical, as may be seen this is not necessary.

The arrangement of terrain lugs 58 on the track 50 in FIG. 8 is exemplary only; other arrangements may be equally suitable.

Figure 9:
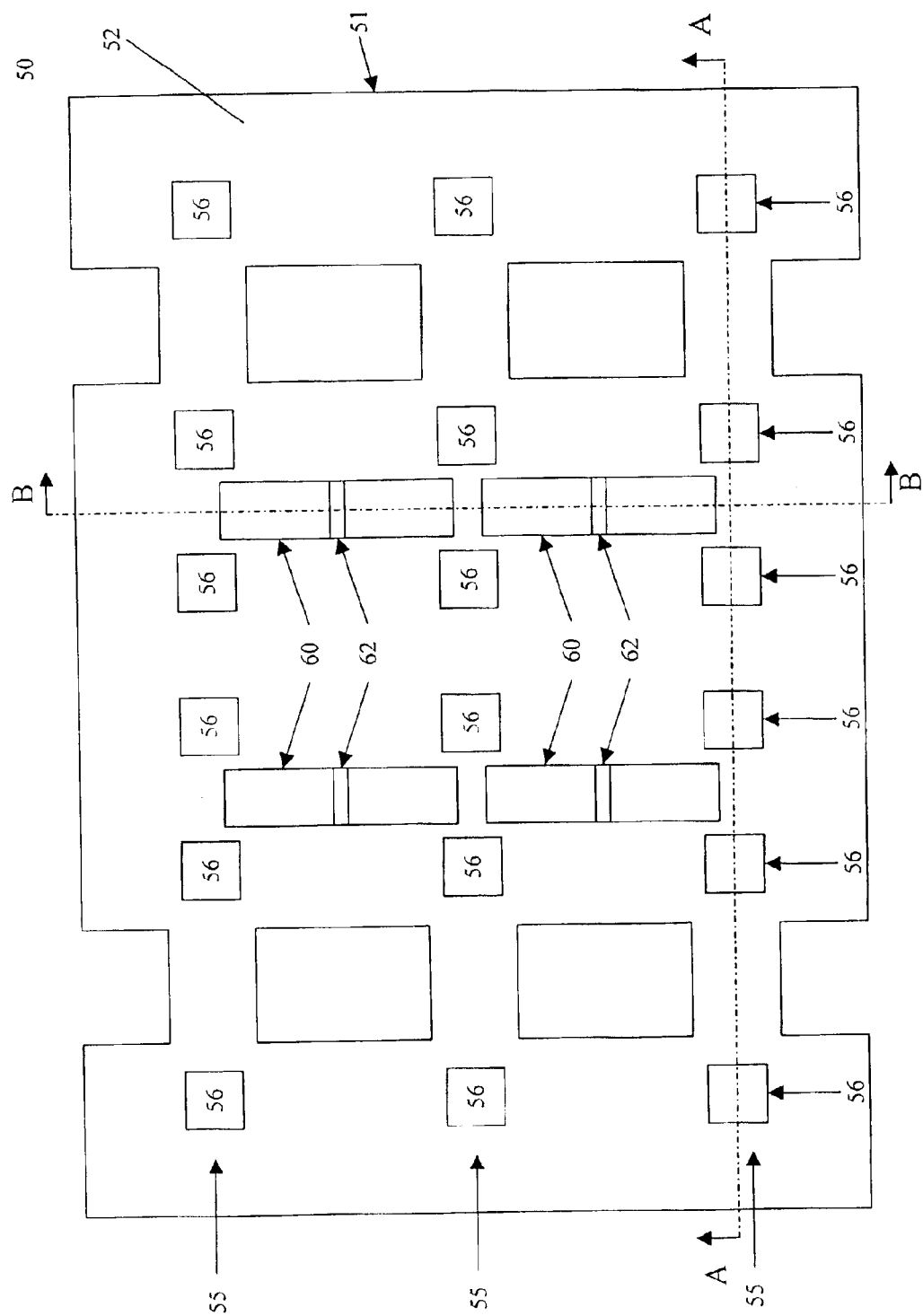
FIG. 9 is an overhead view of a portion of the inner surface of the portion of the track shown in FIG. 8.

FIG. 9 shows the section of a track 50 in accordance with the principles of the claimed invention illustrated in FIG. 8, but from the opposite side. As may be seen from FIG. 9, the track 50 includes a plurality of drive profiles 55, distributed circumferentially about an inner surface 52 of the track substrate 51.

Each of the drive profiles 55 includes at least one drive lug 56 arranged somewhere across the lateral width of the track substrate 51. In certain embodiments, there may be at least two drive lugs 56 spaced apart from one another laterally across the track substrate 51. One exemplary arrangement for embodiments having at least two drive lugs 56 is that shown in FIG. 9, wherein at least some of the drive lugs 56 are arranged relatively close to one another, in pairs. However, this is exemplary only.

Figure 24:
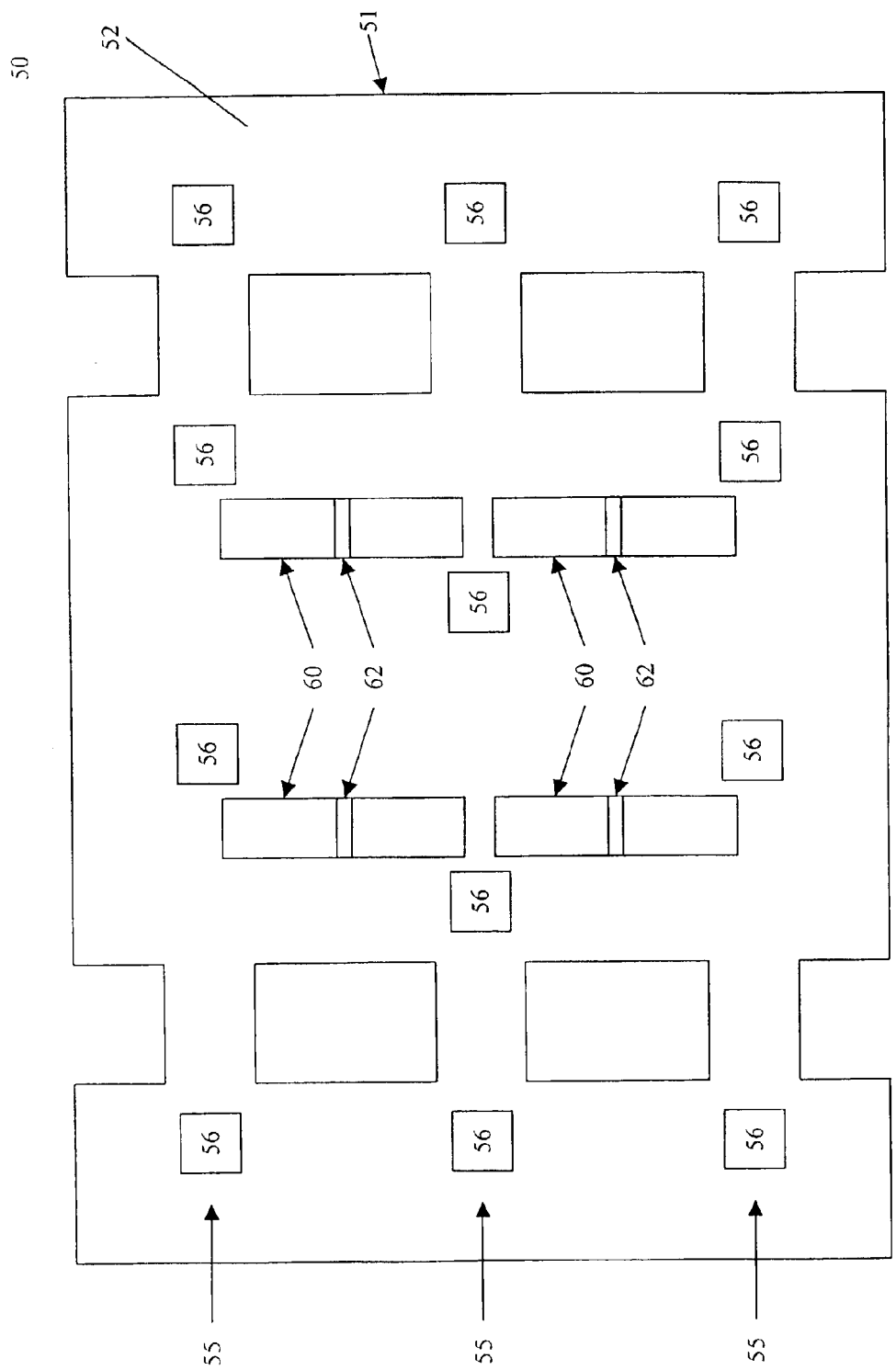
FIG. 24 is an overhead view of a portion of the inner surface of another exemplary embodiment of a track in accordance with the principles of the claimed invention.

As shown in FIG. 9, the drive profiles 55 include six drive lugs 56. However, this is exemplary only, and drive profiles 55 having other numbers of drive lugs 56 may be equally suitable. In addition, although all of the drive profiles 55 shown in FIG. 9 have the same number and arrangement of drive lugs 56, this is also exemplary only. Other suitable embodiments include, but are not limited to, that illustrated in FIG. 24, wherein some of the drive lugs 56 are shown to alternate from left to right when comparing one drive profile 55 to an adjacent drive profile 55. Furthermore, the shapes illustrated for the drive lugs 56 are exemplary only; a variety of shapes for the drive lugs 56 other than those shown may be equally suitable.

The drive lugs 56 are adapted to engage the drive mechanism of the track system. The drive lugs 56 also may be adapted to engage other components of the track system, including but not limited to one or more wheels.

The precise configuration of the drive lugs 56 may vary from embodiment to embodiment. A variety of factors may determine the configuration of the drive lugs 56, including but not limited to: the form and size of the drive mechanism;

the form and size of any additional components that the drive lugs 56 are to engage; the weight of the vehicle; the desired speed, maneuverability, acceleration, and other performance of the vehicle; and the desired ride characteristics for the vehicle.

As shown in FIG. 9, a track 50 in accordance with the principles of the claimed invention also includes a plurality of projections 60 on the inner surface 52 of the track substrate 51. The projections 60 are arranged such that they engage a wheel 70 in a track system that includes the track 50. The manner of this engagement may be seen from FIGS. 19 and 20, which are described further below.

A variety of arrangements may be suitable for the projections 60. Returning to FIG. 9, each projection 60 is disposed circumferentially between two drive profiles 55.

In addition, in embodiments wherein at least some of the drive profiles 55 include two or more drive lugs 56, the projections 60 also may be arranged so that each projection 60 is disposed laterally between two drive lugs 56. Such an arrangement is visible in FIG. 9.

Figure 23:
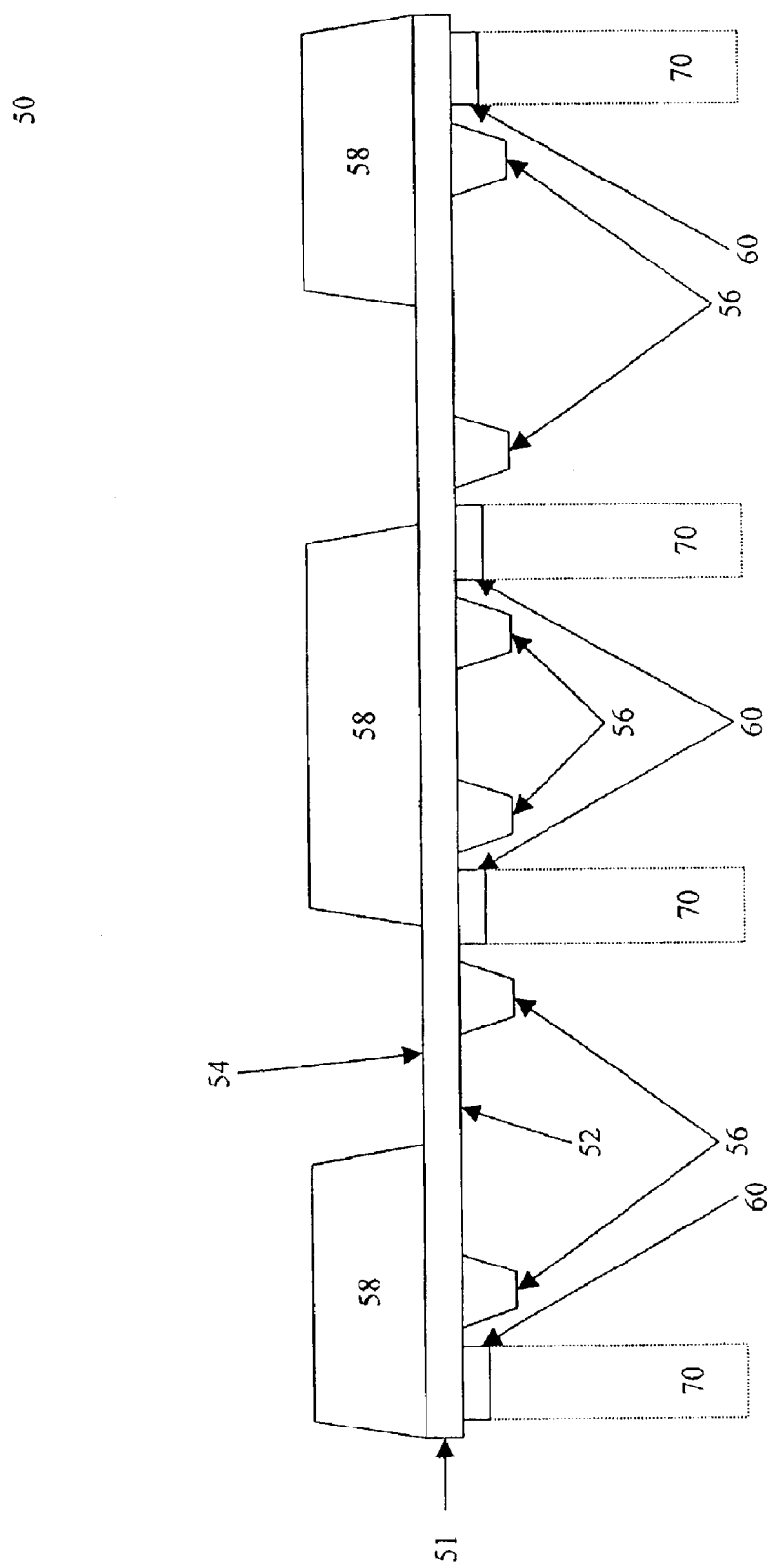
FIG. 23 is a lateral cross section of a portion of another exemplary embodiment of a track in accordance with the principles of the claimed invention.

However, this is exemplary only. As shown in FIG. 23, the outermost projections 60 on the left and right edges of the track 50 are not disposed between two drive lugs 56, but instead are arranged with a drive lug 56 on only one side. As shown in ghost form, the track 50 may be engaged by wheels 70 at those projections 60 that are not disposed between two drive lugs 56 as well as at those projections 60 that are disposed between two drive lugs 56.

Furthermore, although as illustrated the projections 60 are shown to be proximate to the drive lugs 56 in a lateral direction (i.e. across the width of the track 50), this also is exemplary only.

Returning to FIG. 9, the projections 60 are disposed between the drive profiles 55, it is not necessary for the projections 60 to be completely contained within the space between drive profiles 55. That is, there need not be space between the ends of the projections 60 and the drive profiles 55. As shown in FIG. 9, the projections 60 extend the full distance between drive profiles 55, and indeed extend into the drive profiles 55. However, such an arrangement is exemplary only. Arrangements wherein the projections 60 extend only to the edge of the drive profiles 55, or do not extend all the way to the drive profiles 55, may be equally suitable. Likewise, arrangements wherein the projections 60 extend further than illustrated in FIG. 9 may also be suitable, including but not limited to embodiments wherein the projections 60 extend far enough that they are in contact with adjacent projections 60.

Furthermore, the general arrangement of the arrangement of the projections 60 as shown in FIG. 9 is exemplary only. Although the projections 60 as illustrated are arranged so that each projection 60 is disposed circumferentially between two drive profiles 55, and so that each projection 60 is disposed laterally between two drive lugs 56, other arrangements may be equally suitable, so long as the projections 60 are arranged such that they engage the wheel 70.

Figure 10:
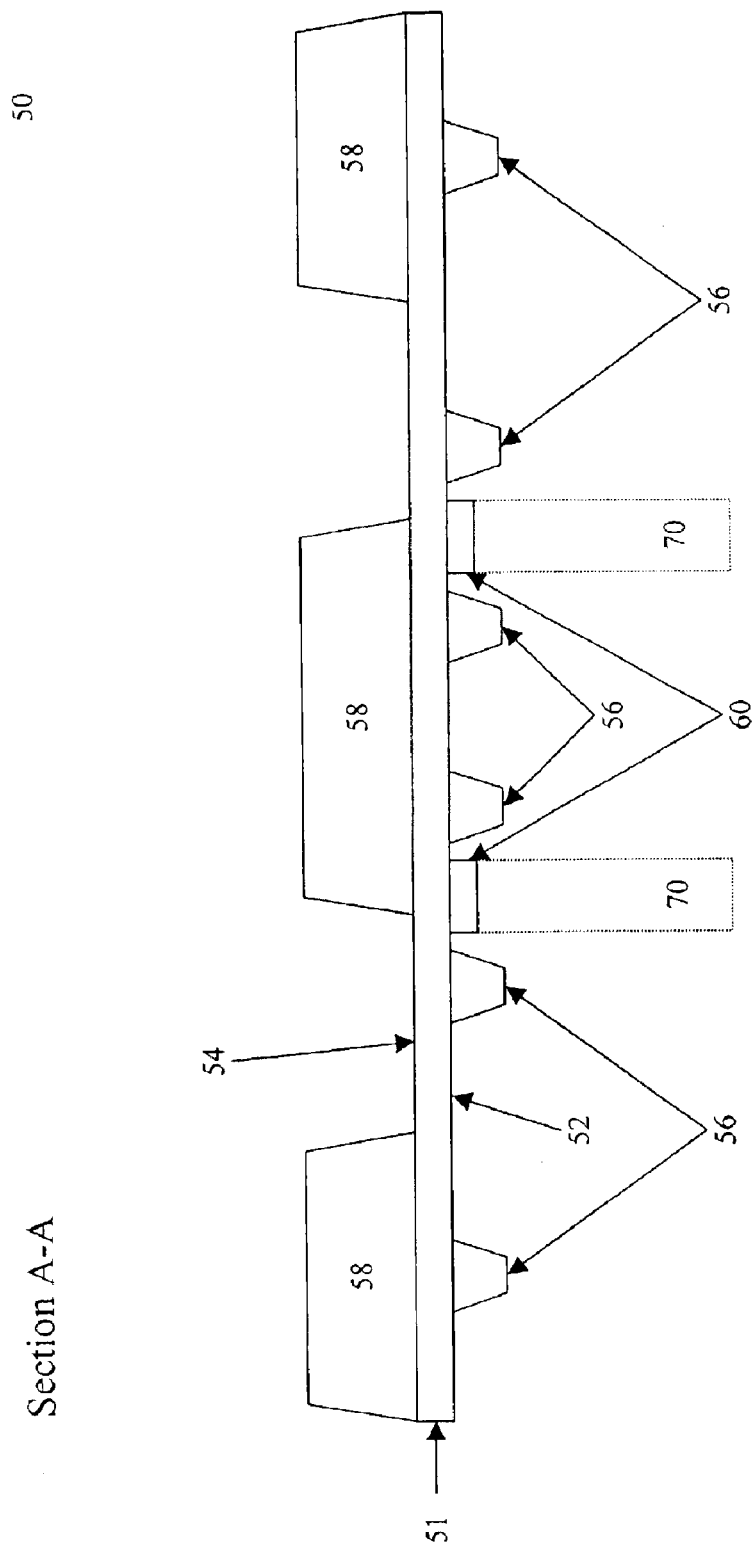
FIG. 10 is a lateral cross section of the portion of the track illustrated in FIGS. 8 and 9.

As is visible in FIGS. 10 through 15, the projections 60 extend some distance above the track substrate 51, although it is emphasized that the figures herein should not be taken as being to scale. The projections 60 are further described below. The relative arrangement of the projections 60 to the drive profiles 55 and the individual drive lugs 56 can also be seen in FIGS. 10 through 15, which also are further described below. In addition, FIG. 10 shows exemplary wheels 70 in ghost form, illustrating the positions in which they might engage the projections 60 and the track 50 as a whole.

Figure 19:
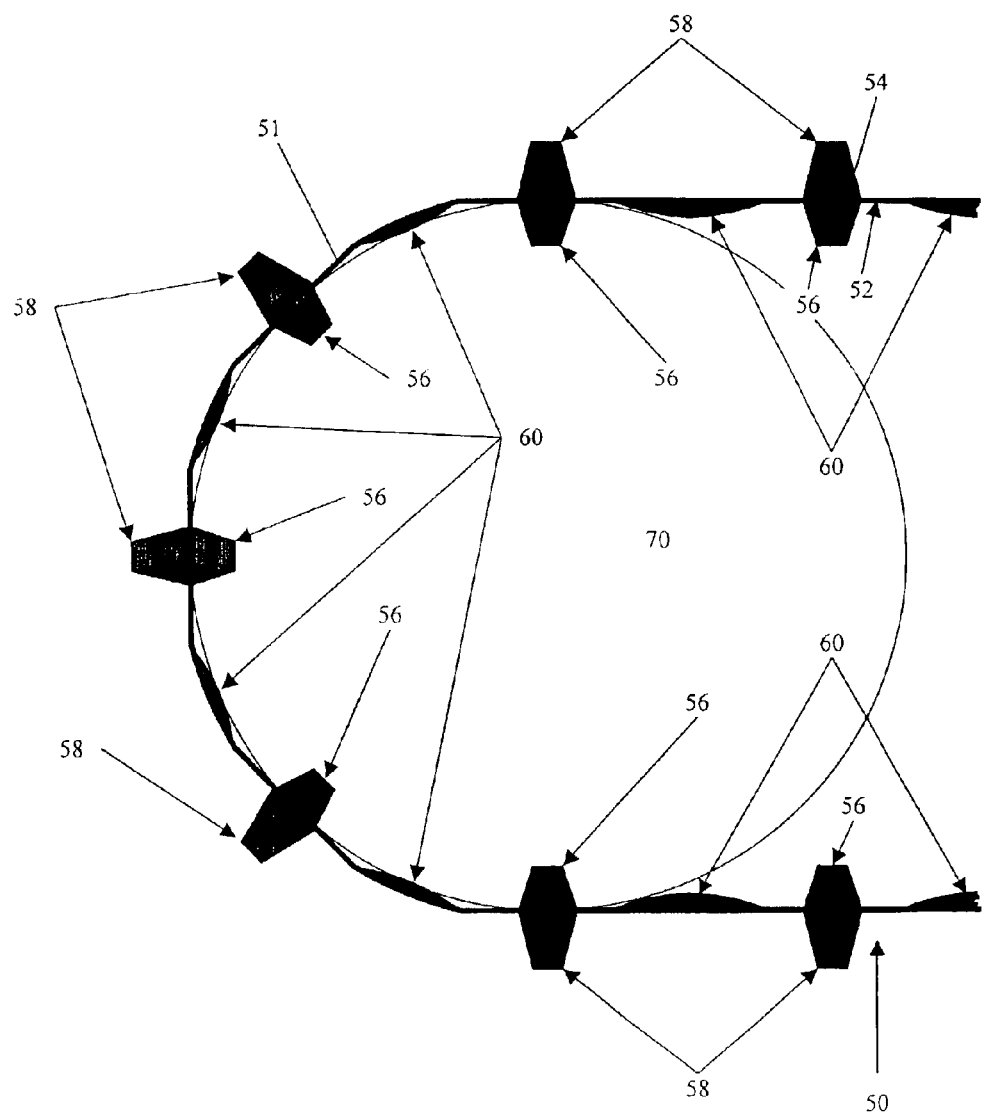
FIG. 19 is a schematic figure showing the engagement between an exemplary wheel and an exemplary embodiment of a track in accordance with the principles of the claimed invention.

Turning to FIG. 19, a schematic illustration therein shows the engagement between a portion of a track 50 in accordance with the principles of the claimed invention and a wheel 70 about which the track 50 is changing direction.

As previously described, a track 50 in accordance with the principles of the claimed invention is sufficiently flexible to enable engagement with the track system. However, as also previously described, the increased thickness of a track 50 due to the presence of drive lugs 56 and terrain lugs 58 may make the track 50 less flexible in the vicinity of the drive lugs 56 and terrain lugs 58. Consequently, the track 50 does not bend as readily in the vicinity of the drive lugs 56 and terrain lugs 58 as in areas between adjacent drive lugs 56 and terrain lugs 58.

Thus, much of the bending of the track 50 occurs in areas in between adjacent drive lugs 56 and terrain lugs 58. As a result, the track substrate between adjacent drive lugs 56 and terrain lugs 58 may not be in direct contact with the wheel 70. However, because the projections 60 extend inward from the track substrate 51 towards the wheel 70, the projections 60 can contact the wheel 70 even if the track substrate 51 does not.

Figure 20:
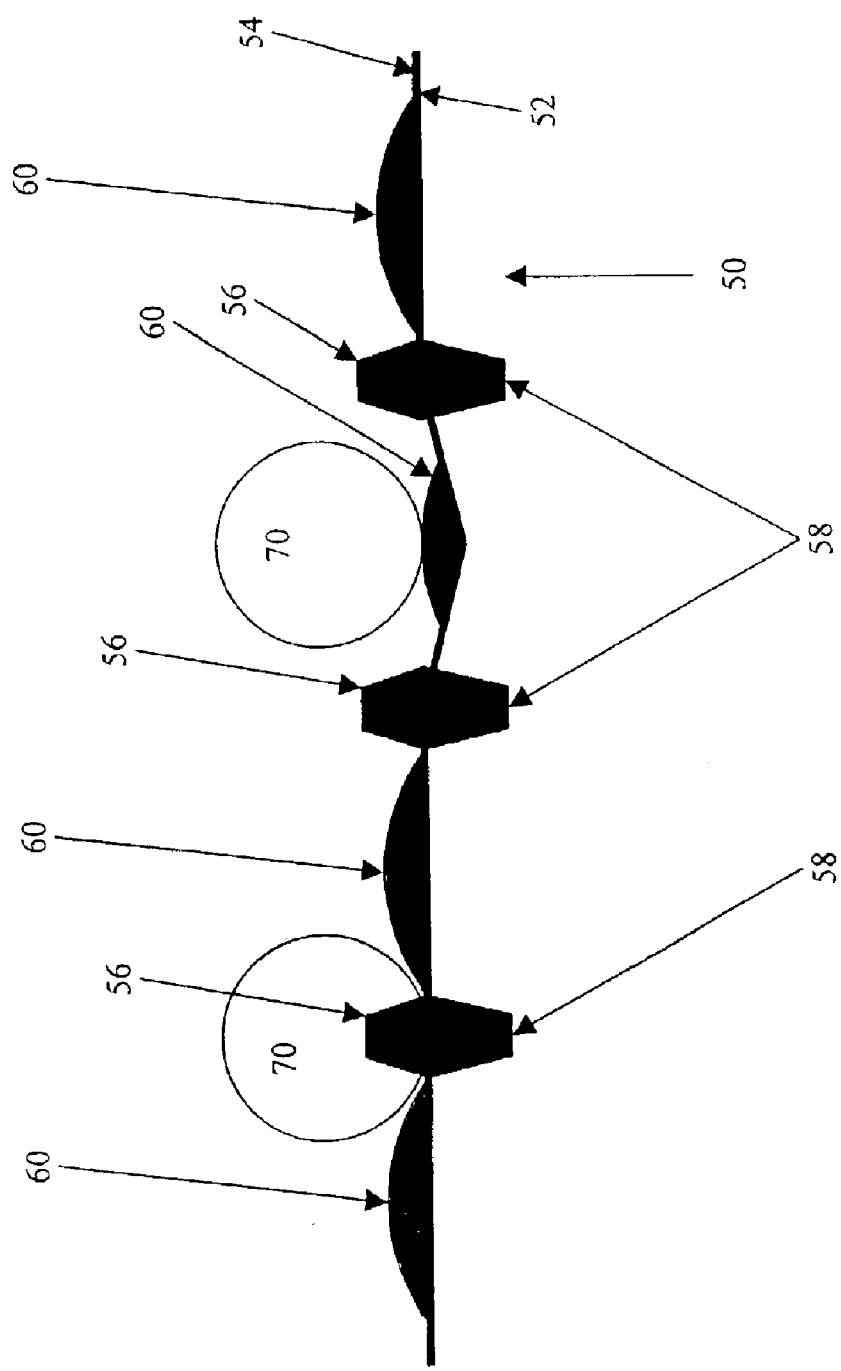
FIG. 20 is a schematic figure showing engagement between other exemplary wheels and an exemplary embodiment of a track in accordance with the principles of the claimed invention.

In addition, with reference to FIG. 20, a schematic illustration therein shows the engagement between a track 50 in accordance with the principles of the claimed invention and a wheel 70.

As noted above, a track 50 in accordance with the principles of the claimed invention remains sufficiently flexible to bend, i.e. around a wheel 70 so as to change direction. Also as previously described, the weight of a vehicle when borne by wheels 70 and transferred to a track 50 in accordance with the principles of the claimed invention can be considerable. Consequently, the track 50 may deform in those areas where it is most flexible, i.e. between the drive lugs 56 and terrain lugs 58, due to the weight of the vehicle.

However, because the projections 60 project inward from the track 50 towards the wheels 70 that are bearing down on the track 50, the height of the projections 60 opposes the downward vertical motion of the wheels 70 when they are between the drive lugs 56 and terrain lugs 58. Thus, as shown in FIG. 20, the wheel 70 that is between the drive lugs 56 and terrain lugs 58 is held at or at least closer to the vertical position of the wheel 70 that is at one of the drive lugs 56 and terrain lugs 58. As a result, the vertical motion of the wheels 70 is eliminated or reduced.

It is believed that because a track 50 in accordance with the principles of the claimed invention conforms well to a wheel 70, and because a track 50 in accordance with the principles of the claimed invention reduces the vertical motion of load-bearing wheels 70, noise and vibration generation by a track system with such a track 50 is reduced as compared to the same or a similar track system with a conventional track 10.

Figure 21:
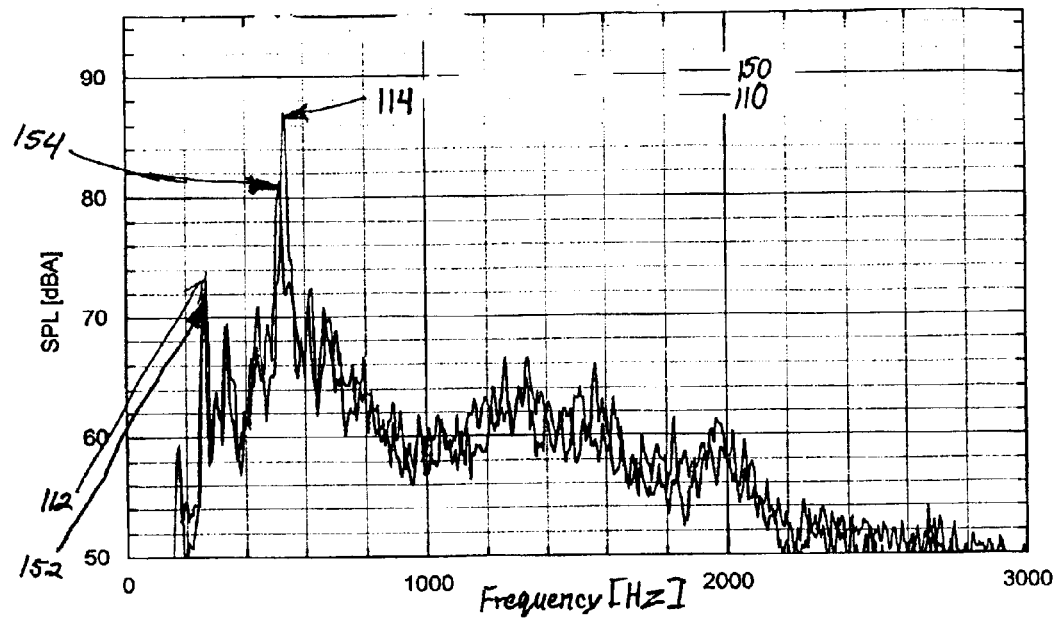
FIG. 21 is a plot showing noise generated at a range of frequencies for a conventional track and an exemplary embodiment of a track in accordance with the principles of the claimed invention at 40 mph, on the right side of a vehicle.
Figure 22:
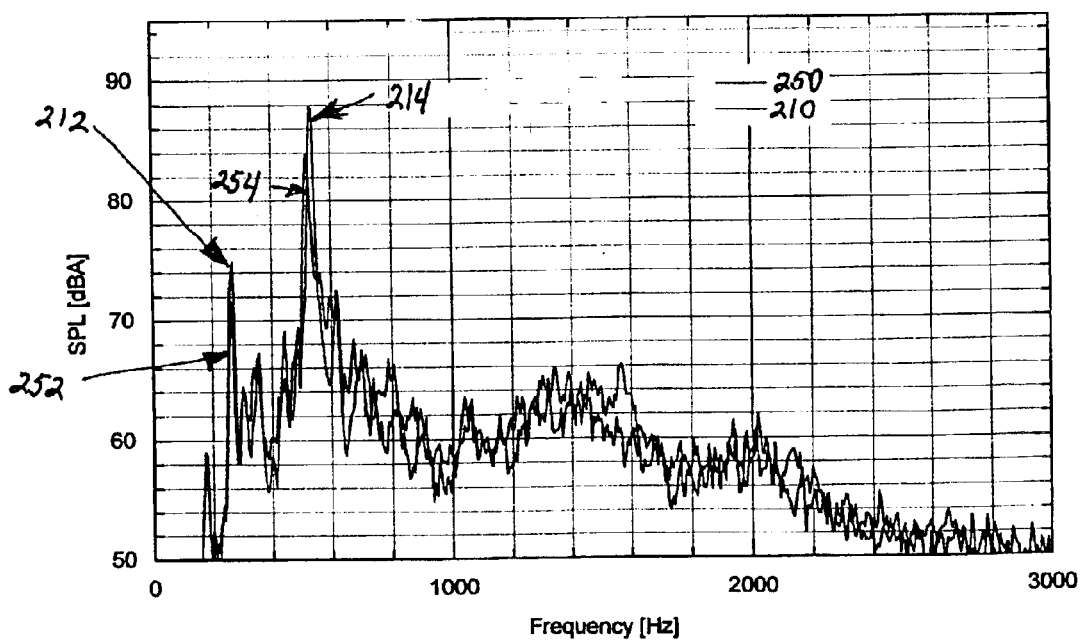
FIG. 22 is a plot showing noise generated at a range of frequencies for a conventional track and an exemplary embodiment of a track in accordance with the principles of the claimed invention at 40 mph, on the left side of a vehicle.

The difference in noise between a track system with an exemplary embodiment of a track 50 in accordance with the principles of the claimed invention and a track system with a conventional track 10 is illustrated in FIGS. 21 and 22.

FIGS. 21 and 22 show plots of noise intensity at various frequencies. Traces 150 and 250 represent noise intensity for an exemplary embodiment of a track 50 in accordance with the principles of the claimed invention in FIGS. 21 and 22 respectively, while traces 110 and 210 represent noise intensity for a conventional track 10. FIG. 21 shows noise as measured from the right side of a snowmobile used as a test vehicle, while FIG. 22 shows noise as measured from the left side.

As may be observed, the noise levels in traces 110 and 210 are generally higher than the noise levels in traces 150 and 250. In particular, as is visible in FIG. 21, trace 110 is significantly higher at the first and second order track pitches 112 and 114 than trace 150 at similar first and second order track pitches 152 and 154. Likewise, as is visible in FIG. 22, trace 210 is significantly higher at the first and second order track pitches 212 and 214 than trace 250 at similar first and second order track pitches 252 and 254.

Overall, noise output from a track system with an exemplary embodiment of a track 50 in accordance with the principles of the claimed invention is typically a minimum 4 dB lower than noise output from a track system with a conventional track 10. However, the noise reduction is not limited to 4 dB; the measured difference in noise output may be 6 to 8 dB or more.

Exemplary indications of noise reduction may be seen, for example, by examination of the peaks at the frequencies having the highest levels of noise in FIGS. 21 and 22.

It is noted that decibels are logarithmic units. Therefore, peaks represent much greater levels of noise than surrounding non-peak regions. For example, an increase of 4 dB represents a doubling of the noise at a given frequency. Thus, even a relatively narrow peak of significant height can represent a substantial portion of the total noise output. Because of this, the differences in the height of the peaks in FIGS. 21 and 22 are not merely of interest with regard to the specific frequencies at which the peaks occur, but also may be considered indicative of a difference in overall noise between a conventional track and one in accordance with the principles of the claimed invention.

In addition, it is noted that for actual vehicles in "field" conditions, precise measurements of noise reduction depend to some degree upon the manner in which noise is measured, among other factors. A variety of common standards for noise measurement exist. For purposes of comparison, the noise readings described herein may be considered to be similar to those obtained by noise testing in accordance with SAE J-1161 for steady state operation. However, it is emphasized that actual noise reduction is not necessarily limited to noise reduction as measured only in accordance with SAE J-1161.

Returning to FIG. 10, a cross section along line A—A of FIGS. 8 and 9 is shown therein. It may be conveniently seen therein that each of the projections 60 is disposed laterally between two drive lugs 56.

Figure 11:
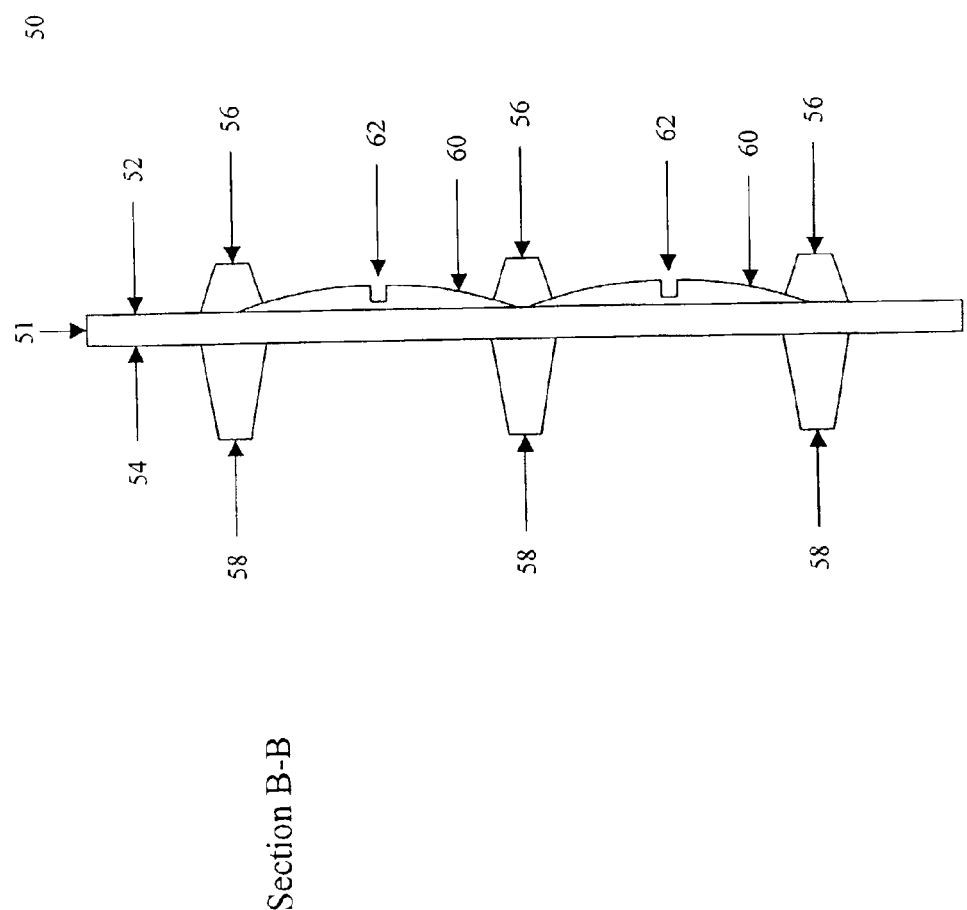
FIG. 11 is a circumferentially cross section of the portion of the track illustrated in FIGS. 8 and 9.

Likewise in FIG. 11, a cross-section along line B—B of FIGS. 8 and 9, it may be conveniently seen that each of the projections 60 is disposed circumferentially between two drive profiles 55. Note that although only one drive lug 56 is visible for each drive profile 55 in FIG. 11, the drive profiles 55 actually include several drive lugs 56, as visible in FIGS. 9 and 10.

However, it is again emphasized that although the arrangement of the projections 60 as shown in FIGS. 10 and 11 may be suitable for certain embodiments of the track 50, it is exemplary only, and other arrangements may be equally suitable.

FIG. 11 also illustrates a gap 62 that may be present in some or all of the projections 60. As shown, the gaps 62 extend laterally across the projections 60. Because the presence of the projections 60 increases the local thickness of the track 50, the flexibility of the track 50 may be slightly diminished, especially near the thickest part of the projections 60. The gaps 62 in the projections 60 facilitate greater flexibility of the track 50 in those areas.

Turning to FIG. 12, a magnified view of a portion of a cross section similar to that in FIG. 11 is illustrated.

As has been previously stated, the figures herein should not be interpreted as being to scale. Although the relative heights of the projection 60, drive lugs 56, and terrain lugs 58 may be illustrative, they are exemplary only, and other embodiments with other relative heights may be equally suitable.

The actual height of the projections 60 is defined functionally. That is, the height of the projections 60 is sufficient as to yield a track 50 with reduced production of noise and/or vibration compared to a conventional track 10. The height suitable for yielding such noise and/or vibration reduction may vary considerably from embodiment to embodiment.

In practice, it has been determined that for a wheel with a radius of approximately 2.5 inches, the height of the projections 60 is preferably at least 0.075 inches. The height of the projections 60 is more preferably at least 0.100 inches. The height of the projections 60 is most preferably at least 0.125 inches. However, the height of the projections 60 also may advantageously be at least 0.150 inches. Furthermore, the height of the projections 60 also may be at least 0.175 inches.

The height of the projections may also be expressed in relative terms, as a function of the wheels or other structures in the track system. It has been determined that for a wheel of a given radius, the height of the projections 60 is preferably at least 3% of the wheel radius. The height of the projections 60 is more preferably at least 4% of the wheel radius. The height of the projections 60 is most preferably at least 5% of the wheel radius. However, the height of the projections 60 also may advantageously be at least 6% of the wheel radius. Furthermore, the height of the projections 60 also may be at least 7% of the wheel radius.

As described elsewhere, in embodiments wherein the track 50 engages two or more wheels 70, the wheels 70 may be of different size. When determining the height of projections 60 for such embodiments based on a percentage of wheel radius for wheels 70 of different size, a variety of approaches may be suitable. For certain embodiments, it may be advantageous to determine the height of the projections 60 based on an extreme, i.e. the size of the smallest or largest wheel 70. Alternatively, it may be advantageous in certain embodiments to determine the height of the projections 60 based on a mean radius, median radius, etc. of some or all of the wheels 70. Other approaches also may be equally suitable.

It is noted that the height of the projections 60 in a given track 50 need not be the same for each projection 60, though this may be the case for certain embodiments.

The width of the gap 62 also may vary considerably from embodiment to embodiment. As with the height of the projections 60, factors including but not limited to the size and configuration of any wheels or other structures present in the track system may be relevant to determining a suitable width for the gap 62. Given a wheel with a radius of approximately 2.5 inches, in a preferred embodiment, the gap 62 may be 0.03 to 0.09 inches wide. In a more preferred embodiment, the gap 62 may be 0.05 to 0.07 inches wide. In a still more preferred embodiment, the gap 62 may be 0.055 to 0.065 inches wide.

The width of the gaps 62 in a given track 50 need not be the same for each gap 62, though this may be the case for certain embodiments.

Furthermore, the depth of the gaps 62 in a given track 50 need not be the same for each gap 62, though this also may be the case for certain embodiments. The depth of the gaps 62 may vary, as may be seen from a comparison of FIGS. 11 and 12. The gaps 62 in FIG. 11 extend only partway to the track substrate 51, while the gap 62 shown in FIG. 12 extends all the way to the track substrate 51.

It is also noted that the presence of gaps 62 is exemplary only, and that embodiments without gaps 62 may be equally suitable.

Furthermore, the shape and configuration of the gap 62 may vary from embodiment to embodiment.

The gaps 62 in FIG. 11 have flat bottoms with square corners, while the gap 62 shown in FIG. 12 has a rounded bottom, with full radii on both sides. These configurations are exemplary only, however, and other configurations may be equally suitable.

Figure 13:
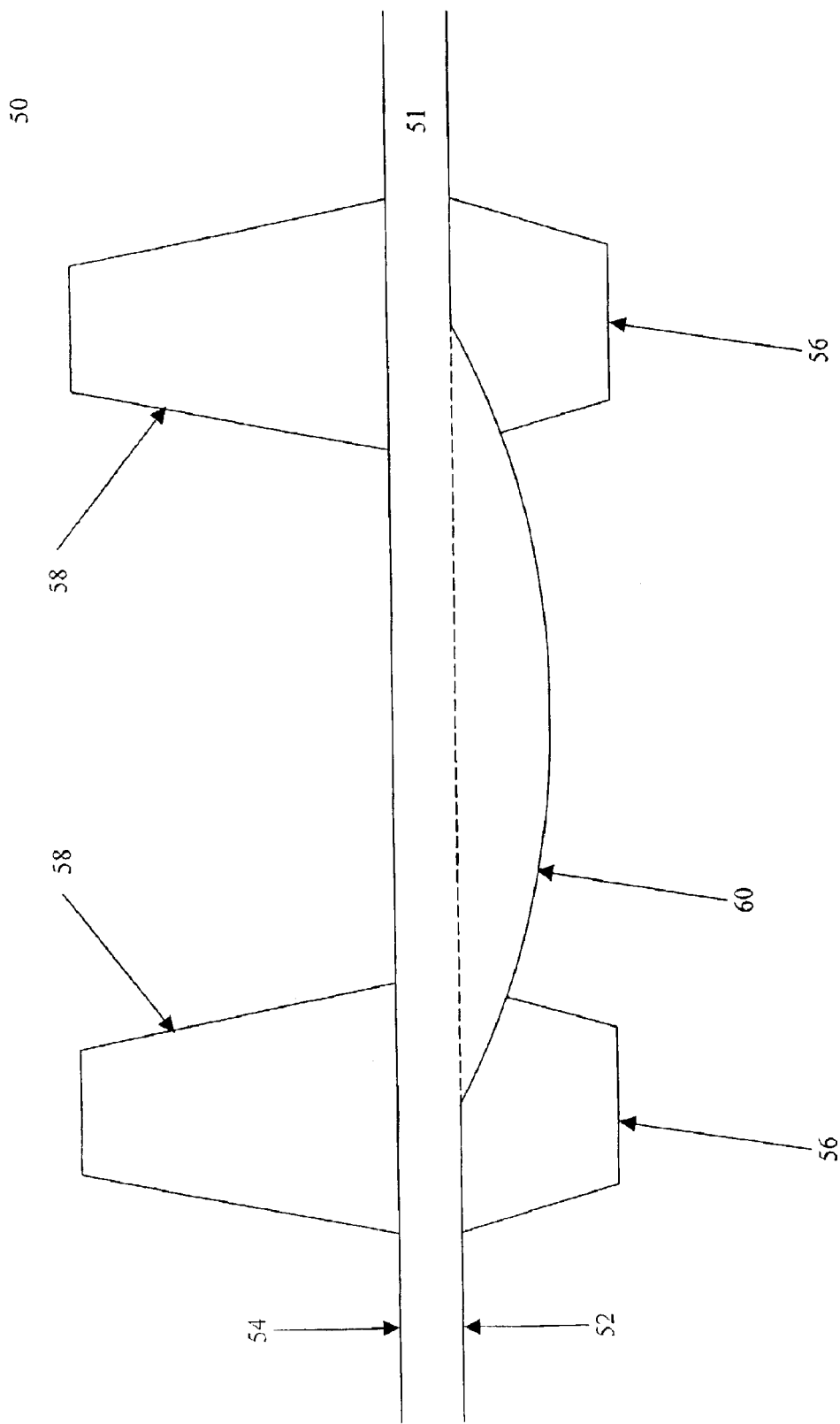
FIG. 13 is a magnified lateral cross section of a portion of another exemplary embodiment of a track in accordance with the principles of the claimed invention, with a projection that does not include a gap.
Figure 15:
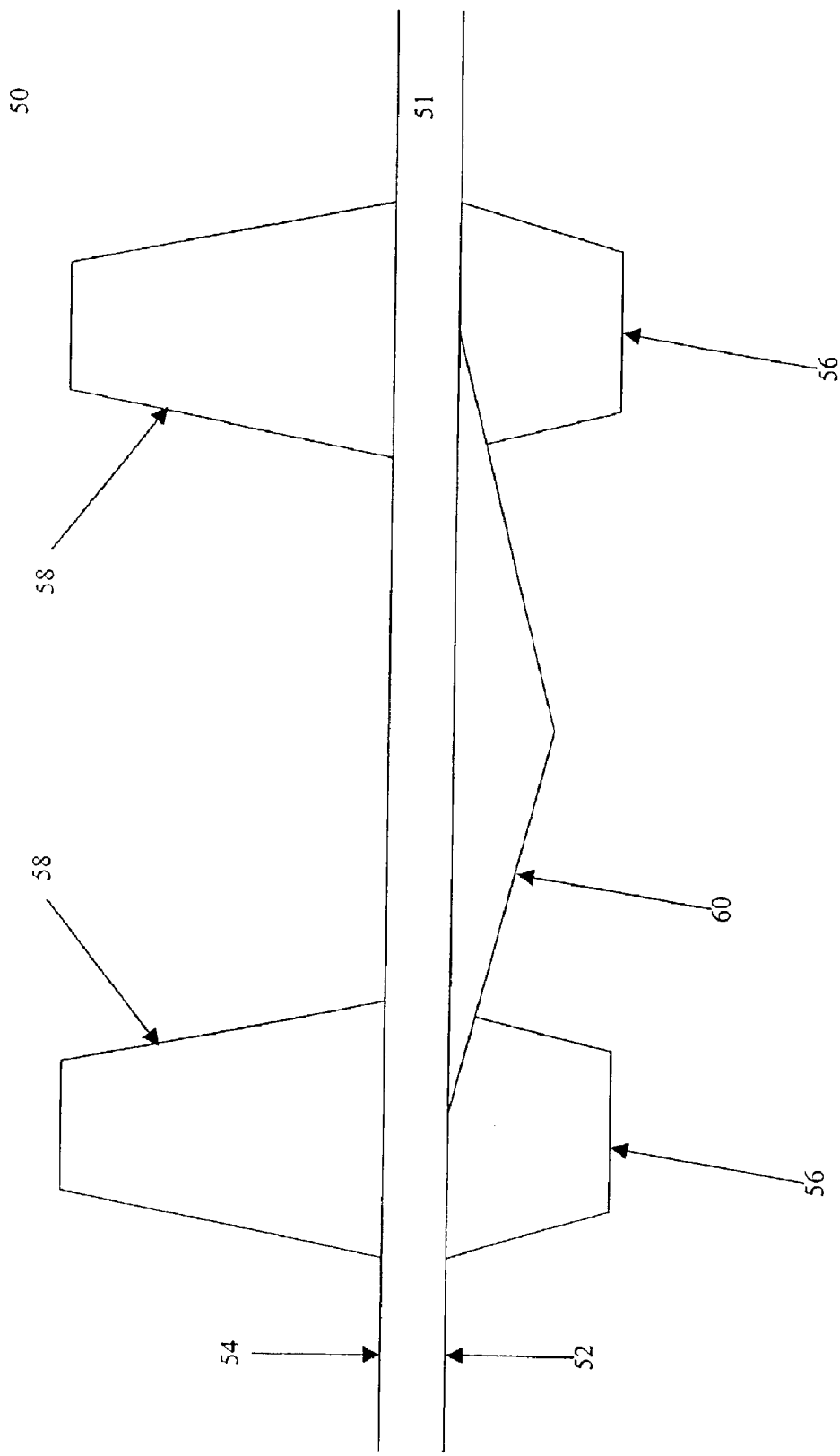
FIG. 15 is a magnified lateral cross section of a portion of another exemplary embodiment of a track in accordance with the principles of the claimed invention, with a projection that does not include a gap.

Likewise, as may be seen from a comparison of FIGS. 12 and 13 with FIGS. 14 and 15, the shape of the projections 60 themselves also may vary from embodiment to embodiment. The projections 60 shown in FIGS. 12 and 13 are illustrated with a curved cross-section, in particular a cross section approximating segments of a circle. In contrast, the projections 60 shown in FIGS. 14 and 15 are illustrated with a cross-section in the form of a double wedge or flattened triangle. These configurations are exemplary only, and other configurations may be equally suitable.

Figure 16:
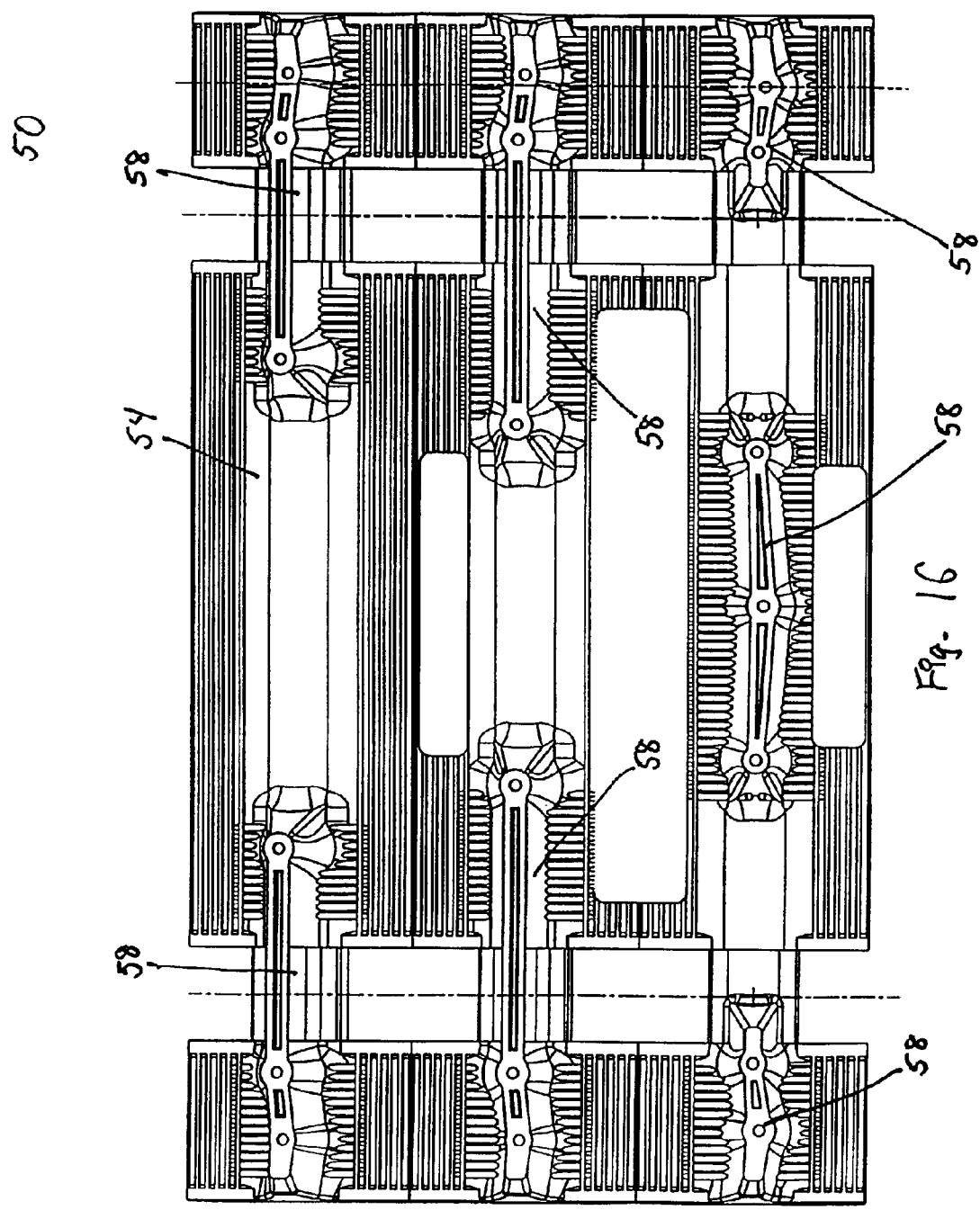
FIG. 16 is an overhead view of a portion of the outer surface of another exemplary embodiment of a track in accordance with the principles of the claimed Invention.
Figure 17:
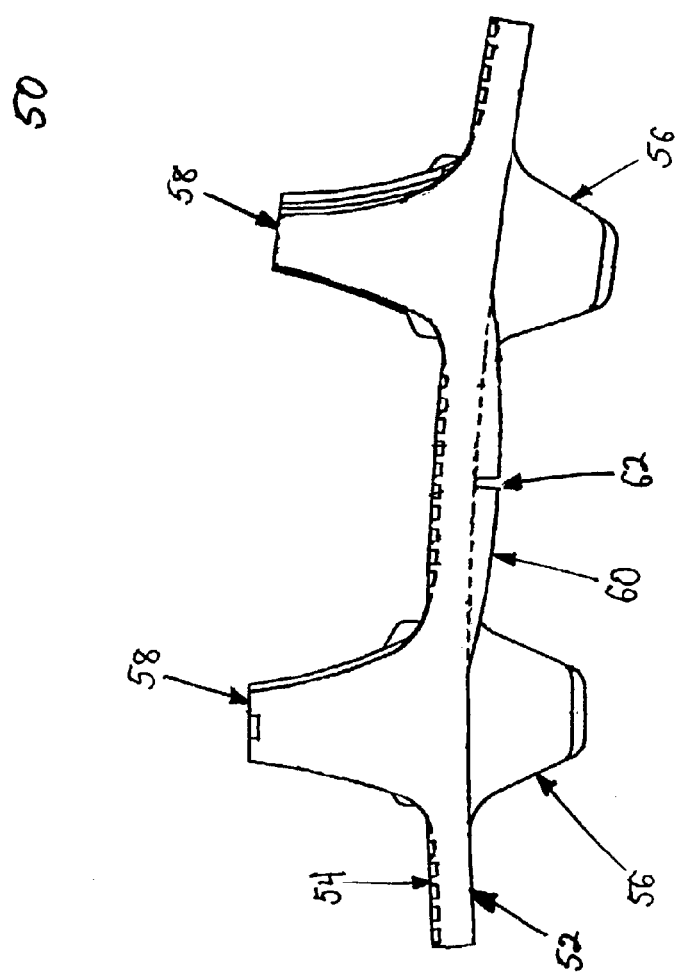
FIG. 17 is a circumferentially cross section of a portion of the track illustrated in FIG. 16.
Figure 18:
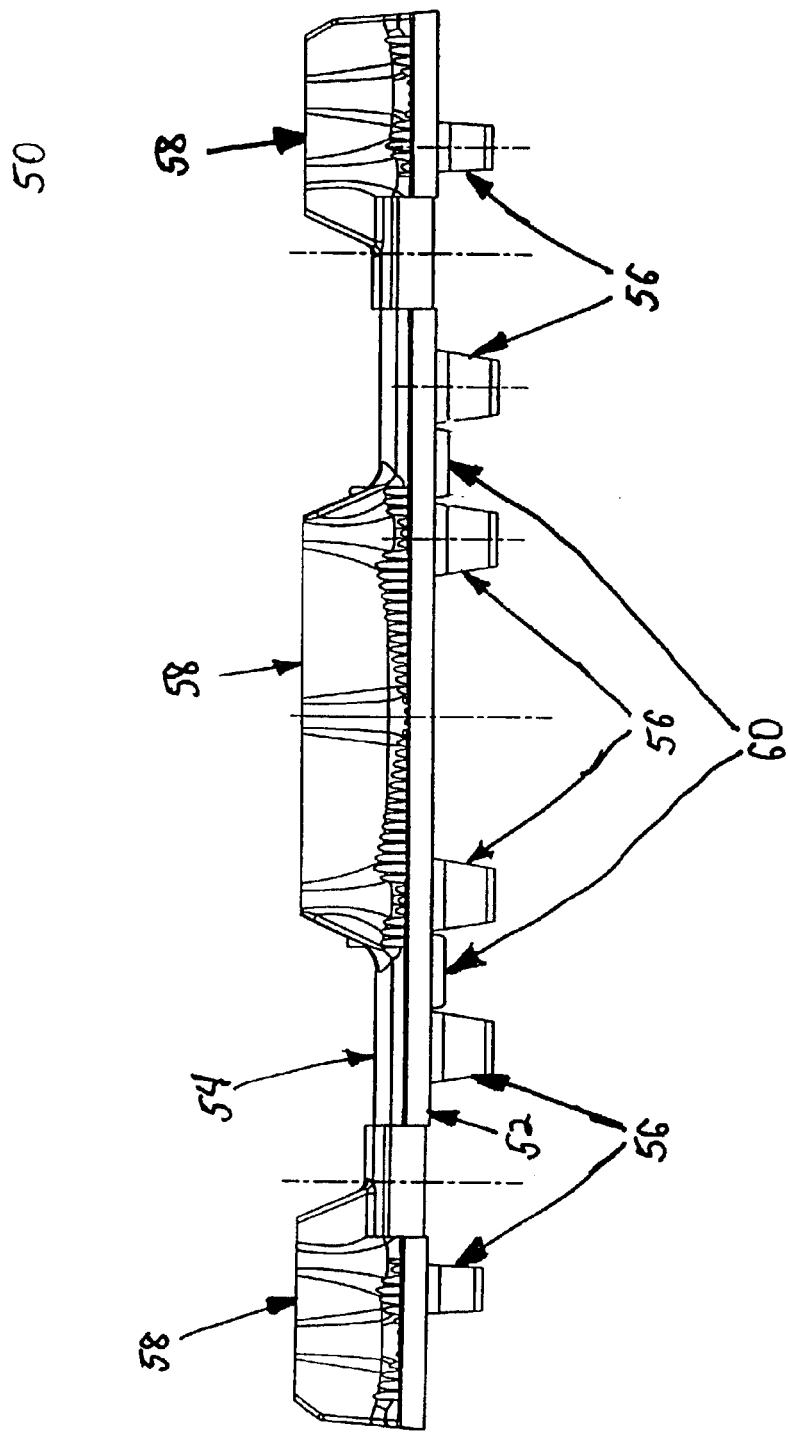
FIG. 18 is a lateral cross section of a portion of the track illustrated in FIG. 16.

It is noted that many of the figures herein are schematic, or are otherwise simplified for purposes of clarity. However, this should not be interpreted as suggesting that the actual structure of any particular embodiment of a track 50 in accordance with the principles of the claimed invention is or must be simple in shape or design. FIGS. 16, 17, and 18 show views generally similar to the views of FIGS. 8, 12, and 10 respectively. However, the embodiment of a track 50 in accordance with the principles of the claimed invention illustrated in FIGS. 16, 17, and 18 is significantly more complex in terms of structure and shape. As may be seen, the shape and structure of a track 50 in accordance with the principles of the claimed invention may vary considerably from embodiment to embodiment.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A track, comprising:
   a track substrate;
   a plurality of terrain lugs distributed circumferentially about said track substrate on an outer surface of said track substrate;
   a plurality of drive profiles distributed circumferentially about said track substrate on an inner surface of said track substrate; and
   a plurality of projections on said inner surface, said projections being arranged so as to engage at least one wheel when said track is in a track system;
   wherein said projections have a height such that a noise generated when said track moves in said track system is at least 4 dB less than a corresponding noise generated when a track without said projections moves in said track system.

2. The track according to claim 1, wherein:
   each of said drive profiles comprises at least two drive lugs spaced apart laterally across said track substrate; and
   each of said projections is disposed circumferentially between two of said drive profiles, and each of said projections also is disposed laterally between two of said at least two drive lugs.

3. The track according to claim 1, wherein said projections define a gap therein, said gaps extending laterally across said projection.

4. The track according to claim 3, wherein said gaps are 0.03 to 0.09 inches wide.

5. The track according to claim 3, wherein said gaps are 0.05 to 0.07 inches wide.

6. The track according to claim 3, wherein said gaps are 0.055 to 0.065 inches wide.

7. The track according to claim 1, wherein a height of said projections is at least 0.075 inches.

8. The track according to claim 1, wherein a height of said projections is at least 0.100 inches.

9. The track according to claim 1, wherein a height of said projections is at least 0.125 inches.

10. The track according to claim 1, wherein a height of said projections is at least 0.150 inches.

11. The track according to claim 1, wherein a height of said projections is at least 0.175 inches.

12. The track according to claim 1, wherein a height of said projections is at least 3% of a radius of a wheel in said track system.

13. The track according to claim 1, wherein a height of said projections is at least 4% of a radius of a wheel in said track system.

14. The track according to claim 1, wherein a height of said projections is at least 5% of a radius of a wheel in said track system.

15. The track according to claim 1, wherein a height of said projections is at least 6% of a radius of a wheel in said track system.

16. The track according to claim 1, wherein a height of said projections is at least 7% of a radius of a wheel in said track system.

17. The track according to claim 1, wherein said noise generated wherein said track when said projections moves in said track system is at least 6 dB less than said noise generated when said track without said projections moves in said track system.

18. The track according to claim 1, wherein said noise generated when said track with said projections moves in said track system is at least 8 dB less than said noise generated when said track without said projections moves in said track system.

19. The track according to claim 1, wherein at least some of said projections have a curved cross-section.

20. The track according to claim 1, wherein at least some of said projections have a double wedge cross-section.

21. The track according to claim 1, wherein said track is a vehicle track for a tracked vehicle.

22. The track according to claim 1, wherein said track is a vehicle track for a tracked vehicle.

23. A snowmobile comprising the track of claim 1.

24. A method of reducing noise produced by a moving track, comprising the steps of:
   on a track comprising:
      a track substrate;
      a plurality of terrain lugs distributed circumferentially about said track substrate on an outer surface of said track substrate; and
      a plurality of drive profiles distributed circumferentially about said track substrate on an inner surface of said track substrate;

providing a plurality of projections on said inner surface, such that said projections are arranged so as to engage a wheel when said track is in a track system;
wherein said projections have a height such that a noise noise generated when said track moves in a track system is at least 4 dB less than a corresponding generated when a track without said projections moves in a track system.

25. The method according to claim 24, wherein:
each of said drive profiles comprises at least two drive lugs spaced apart laterally across said track substrate; and
each of said projections is disposed circumferentially between two of said drive profiles, and each of said projections also is disposed laterally between two of said at least two drive lugs.

26. The method according to claim 24, further comprising the step of defining gaps in said projections, said gaps extending laterally across said projection.

27. The method according to claim 26, wherein said gaps are 0.03 to 0.09 inches wide.

28. The method according to claim 26, wherein said gaps are 0.05 to 0.07 inches wide.

29. The method according to claim 26, wherein said gaps are 0.055 to 0.065 inches wide.

30. The method according to claim 24, wherein a height of said projections is at least 0.075 inches.

31. The method according to claim 24, wherein a height of said projections is at least 0.100 inches.

32. The method according to claim 24, wherein a height of said projections is at least 0.125 inches.

33. The method according to claim 24, wherein a height of said projections is at least 0.150 inches.

34. The method according to claim 24, wherein a height of said projections is at least 0.175 inches.

35. The method according to claim 24, wherein a height of said projections is at least 3% of a radius of a wheel in said track system.

36. The method according to claim 24, wherein a height of said projections is at least 4% of a radius of a wheel in said track system.

37. The method according to claim 24, wherein a height of said projections is at least 5% of a radius of a wheel in said track system.

38. The method according to claim 24, wherein a height of said projections is at least 6% of a radius of a wheel in said track system.

39. The method according to claim 24, wherein a height of said projections is at least 7% of a radius of a wheel in said track system.

40. A track, conspiring:
a track substrate;
a plurality of terrain lugs distributed circumferentially about said track substrate on an outer surface of said track substrate;
a plurality of drive profiles distributed circumferentially about said track substrate on an inner surface of said track substrate, each of said drive profiles comprising at least two drive lugs spaced laterally across said track substrate; and
a plurality of projections on said inner surface, said projections being arranged so as to engage at least one wheel when said track is in a track system and disposed at positions that are circumferentially between two of said drive profiles and laterally between two of said drive lugs;
wherein said projections have a height such that at least one of a noise and a vibration generated when said track moves in said track system is less than a corresponding at least one of a noise and a vibration generated when a track without said projections moves in said track system.

41. The track according to claim 40, wherein said projections define a gap therein, said gaps extending laterally across said projection.

42. The track according to claim 41, wherein said gaps are 0.03 to 0.09 inches wide.

43. The track according to claim 40, wherein a height of said projections is at least 0.075 inches.

44. The track according to claim 40, wherein a height of said projections is at least 0.175 inches.

45. The track according to claim 40, wherein a height of said projections is at least 3% of a radius of a wheel in said track system.

46. The track according to claim 40, wherein a height of said projections is at least 7% of a radius of a wheel in said track system.

47. The track according to claim 40, wherein said noise generated when said track with said projections moves in said track system is at least 4 dB less than said noise generated when said track without said projections moves in said track system.

48. The track according to claim 40, wherein at least some of said projections have a curved cross-section.

49. The track according to clam 40, wherein at least some of said projections have a double wedge cross-section.

50. The track according to claim 40, wherein said track is a vehicle track for a tracked vehicle.

51. A snowmobile comprising the track of claim 40.

52. A method of reducing noise produced by a moving track, comprising the steps of:
on a track comprising:
a track substrate;
a plurality of terrain lugs distributed circumferentially about said track substrate on an outer surface of said track substrate; and
a plurality of drive profiles distributed circumferentially about said track substrate on an inner surface of said track substrata, each of said drive profiles comprising at least two drive lugs spaced laterally across said track substrate;
providing a plurality of projections on said inner surface, such that said projections are arranged so as to engage a wheel when said track is in a track system and are disposed at positions circumferentially between two of said drive profiles and laterally between two of said drive lugs;
wherein said projections have a height such that at least one of a noise and a vibration generated when said track moves in a crack system is less than a corresponding at least one of a noise and a vibration generated when a track without said projections moves in a track system.

53. The method according to claim 52, further comprising the step of defining gaps in said projections, said gaps extending laterally across said projection.

54. The method according to claim 53, wherein said gaps are 0.03 to 0.09 inches wide.

55. The method according to claim 52, wherein a height of said projections is at least 0.075 inches.

56. The method according to claim 52, wherein a height of said projections is at least 0.175 inches.

57. The method according to claim 52, wherein a height of said projections is at least 3% of a radius of a wheel in said track system.

58. The method according to claim 52, wherein a height of said projections is at least 7% of a radius of a wheel in said track system.

59. A track, comprising:
- a track substrate;
- a plurality of terrain lugs distributed circumferentially about said track substrate on an outer surface of said track substrate;
- a plurality of drive profiles distributed circumferentially about said track substrate on an inner surface of said track substrate; and
- a plurality of projections on said inner surface, said projections being arranged so as to engage at least one wheel when said track is in a track system, said projections defining gaps therein that extend laterally across said projection;
- wherein said projections have a height such that at least one of a noise and a vibration generated when said track moves in said track system is less than a corresponding at least one of a noise and a vibration generated when a track without said projections moves in said track system.

60. The track according to claim 59, wherein:
- each of said drive profiles comprises at least two drive lugs spaced apart laterally across said track substrate; and
- each of said projections is disposed circumferentially between two of said drive profiles, and each of said projections also is disposed laterally between two of said at least two drive lugs.

61. The track according to claim 59, wherein said gaps are 0.03 to 0.09 inches wide.

62. The track according to claim 59, wherein said gaps are 0.05 to 0.07 inches wide.

63. The track according to claim 59, wherein said gaps are 0.055 to 0.065 inches wide.

64. The track according to claim 59, wherein a height of said projections is at least 0.075 inches.

65. The track according to claim 59, wherein a height of said projections is at least 0.175 inches.

66. The track according to claim 59, wherein a height of said projections is at least 3% of a radius of a wheel in said track system.

67. The track according to claim 59, wherein a height of said projections is at least 7% of a radius of a wheel in said track system.

68. The track according to claim 59, wherein said noise generated when said track with said projections moves in said track system is at least 4 dB less than said noise generated when said track without said projections moves in said track system.

69. The track according to claim 59, wherein at least some of said projections have a curved cross-section.

70. The track according to claim 59, wherein at least some of said projections have a double wedge cross-section.

71. A snowmobile comprising the track of claim 59.

72. A method of reducing noise produced by a moving track, comprising the steps of:
- on a track comprising:
    - a track substrate;
    - a plurality of terrain lugs distributed circumferentially about said track substrate on an outer surface of said track substrate; and
    - a plurality of drive profiles distributed circumferentially about said track substrate on an inner surface of said track substrate;
- providing a plurality of projections on said inner surface, such that said projections are arranged so as to engage a wheel when said track is in a track system, the projections defining gaps therein that extend laterally across the projections;
- wherein said projections have a height such that at least one of a noise and a vibration generated when said track moves in a track system is less than a corresponding at least one of a noise and a vibration generated when a track without said projections moves in a track system.

73. The meted according to claim 72, wherein:
- each of said drive profiles comprises at least two drive lugs spaced apart laterally across said truck substrate; and
- each of said projections is disposed circumferentially between two of said drive profiles, and each of said projections also is disposed laterally between two of said at least two drive lugs.

74. The method according to claim 72, wherein said gaps are 0.03 to 0.09 inches wide.

75. The method according to claim 72, wherein a height of said projections is at least 0.075 inches.

76. The method according to claim 72, wherein a height of said projections is at least 0.175 inches.

77. The method according to claim 72, wherein a height of said projections is at least 3% of a radius of a wheel in said track system.

78. The method according to claim 72, wherein a height of said projections is at least 7% of a radius of a wheel in said track system.

* * * * *